United States Patent
Padmanabhan

(10) Patent No.: US 11,921,887 B2
(45) Date of Patent: Mar. 5, 2024

(54) DECENTRALIZED IDENTITY METAVERSE DATABASE SYSTEM

(71) Applicant: Salesforce, Inc., San Francisco, CA (US)

(72) Inventor: Prithvi Krishnan Padmanabhan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 233 days.

(21) Appl. No.: 17/648,862

(22) Filed: Jan. 25, 2022

(65) Prior Publication Data

US 2023/0237190 A1    Jul. 27, 2023

(51) Int. Cl.
*G06F 7/04*  (2006.01)
*G06F 21/62* (2013.01)
(Continued)

(52) U.S. Cl.
CPC ....... G06F 21/6245 (2013.01); G06Q 30/016 (2013.01); G06T 19/003 (2013.01); *G06T 2219/024* (2013.01)

(58) Field of Classification Search
CPC ...... G06F 21/35; G06F 21/44; G06F 21/6245; H04L 9/0866; H04L 9/0643; H04L 9/50; G06Q 30/016; G06T 19/003
See application file for complete search history.

(56) References Cited

U.S. PATENT DOCUMENTS

| 10,585,657 B2 | 3/2020 | Padmanabhan |
| 10,701,054 B2 | 6/2020 | Padmanabhan et al. |

(Continued)

FOREIGN PATENT DOCUMENTS

| AU | 2019345039 A1 | 4/2021 |
| AU | 2019345040 A1 | 4/2021 |

(Continued)

OTHER PUBLICATIONS

Torres et al. A Survey on Identity Management for the Future Network, IEEE, Aug. 20, 2012, pp. 1-16. (Year: 2012).*

(Continued)

*Primary Examiner* — Philip J Chea
*Assistant Examiner* — Jenise E Jackson
(74) *Attorney, Agent, or Firm* — Polygon IP, LLP

(57) ABSTRACT

A request to contact a service provider may be received from a client machine. The request may be associated with an identity claim and including a service identifier. The identity claim may be validated via a distributed identity service that includes a plurality of identity nodes in communication via a network. Validating the identity claim may include determining a designated network identifier associated with a distributed identity account shared among the plurality of identity nodes. A service query that includes the service identifier and the designated network identifier may be sent to a plurality of customer relations management services. A communication session may be established between a service provider remote computing system and the client machine. The service provider may store customer relations management information at a designated one of the plurality of customer relations management services.

15 Claims, 12 Drawing Sheets

(51) Int. Cl.
*G06Q 30/016* (2023.01)
*G06T 19/00* (2011.01)

(56) References Cited

U.S. PATENT DOCUMENTS

| | | | |
|---|---|---|---|
| 11,038,771 | B2 | 6/2021 | Padmanabhan |
| 11,082,226 | B2 | 8/2021 | Hildebrand et al. |
| 11,128,465 | B2 | 9/2021 | Hildebrand et al. |
| 11,671,531 | B1 * | 6/2023 | Mudireddy ........... H04L 67/306 370/352 |
| 2017/0242887 | A1 | 8/2017 | Zhao et al. |
| 2017/0272901 | A1 * | 9/2017 | Chen ................... G08G 1/146 |
| 2019/0057223 | A1 | 2/2019 | Hanna |
| 2019/0236559 | A1 | 8/2019 | Padmanabhan |
| 2019/0236562 | A1 | 8/2019 | Padmanabhan |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |
| 2019/0244243 | A1 | 8/2019 | Goldberg et al. |
| 2019/0280862 | A1 * | 9/2019 | Crego ................. H04L 63/0861 |
| 2019/0303445 | A1 | 10/2019 | Padmanabhan |
| 2019/0370544 | A1 * | 12/2019 | Wright, Jr. ............ G06Q 10/20 |
| 2019/0377806 | A1 | 12/2019 | Padmanabhan et al. |
| 2020/0036515 | A1 | 1/2020 | Chari et al. |
| 2020/0042939 | A1 | 2/2020 | Padmanabhan |
| 2020/0089663 | A1 | 3/2020 | Padmanabhan |
| 2020/0089670 | A1 | 3/2020 | Padmanabhan et al. |
| 2020/0089671 | A1 | 3/2020 | Padmanabhan et al. |
| 2020/0089672 | A1 | 3/2020 | Velisetti et al. |
| 2020/0133955 | A1 | 4/2020 | Padmanabhan et al. |
| 2020/0134656 | A1 | 4/2020 | Padmanabhan |
| 2020/0159847 | A1 | 5/2020 | Smith et al. |
| 2020/0204375 | A1 | 6/2020 | Coulmeau et al. |
| 2020/0204557 | A1 | 6/2020 | Singh et al. |
| 2020/0250174 | A1 | 8/2020 | Padmanabhan et al. |
| 2020/0250176 | A1 | 8/2020 | Padmanabhan |
| 2020/0250177 | A1 | 8/2020 | Padmanabhan |
| 2020/0250295 | A1 | 8/2020 | Padmanabhan |
| 2020/0250661 | A1 | 8/2020 | Padmanabhan et al. |
| 2020/0250683 | A1 | 8/2020 | Padmanabhan et al. |
| 2020/0250747 | A1 | 8/2020 | Padmanabhan |
| 2020/0252205 | A1 | 8/2020 | Padmanabhan |
| 2020/0252404 | A1 | 8/2020 | Padmanabhan |
| 2020/0252406 | A1 | 8/2020 | Padmanabhan et al. |
| 2020/0287718 | A1 | 9/2020 | Hildebrand et al. |
| 2020/0287719 | A1 | 9/2020 | Hildebrand et al. |
| 2020/0349142 | A1 | 11/2020 | Padmanabhan |
| 2020/0349564 | A1 | 11/2020 | Padmanabhan et al. |
| 2020/0374105 | A1 | 11/2020 | Padmanabhan |
| 2021/0182423 | A1 | 6/2021 | Padmanabhan |
| 2021/0182773 | A1 | 6/2021 | Padmanabhan |
| 2021/0385087 | A1 | 12/2021 | Hildebrand et al. |

FOREIGN PATENT DOCUMENTS

| | | |
|---|---|---|
| AU | 2019345041 A1 | 4/2021 |
| CN | 111902810 A | 11/2020 |
| CN | 111919417 A | 11/2020 |
| CN | 113039568 A | 6/2021 |
| CN | 113056760 A | 6/2021 |
| EP | 3747153 A1 | 12/2020 |
| EP | 3776255 A1 | 2/2021 |
| JP | 2021512416 A | 5/2021 |
| WO | 2019152750 A1 | 8/2019 |
| WO | 2019190855 A1 | 10/2019 |
| WO | 2019241071 A1 | 12/2019 |
| WO | 2020061224 A1 | 3/2020 |
| WO | 2020061225 A1 | 3/2020 |
| WO | 2020061226 A1 | 3/2020 |
| WO | 2020160109 A1 | 8/2020 |
| WO | 2020234814 A1 | 11/2020 |
| WO | 2021116950 A1 | 6/2021 |

OTHER PUBLICATIONS

Zhikui Chen, A Scenario for Identity Management in Daidalos, IEEE, May 1, 2012, pp. 1-8. (Year: 2007).*
U.S. Appl. No. 17/410,932, filed Aug. 24, 2021, Hal Scott Hildebrand.
U.S. Appl. No. 17/648,862, filed Jan. 25, 2022, Prithvi Krishnan Padmanabhan.
U.S. Appl. No. 17/648,865, filed Jan. 25, 2022, Prithvi Krishnan Padmanabhan.
U.S. Appl. No. 16/294,646, Corrected Notice of Allowance dated Jun. 30, 2021, 11 pgs.
U.S. Appl. No. 16/294,646, Examiner Interview Summary dated Mar. 29, 2021, 3 pgs.
U.S. Appl. No. 16/294,646, Examiner Interview Summary dated May 28, 2021, 2 pgs.
U.S. Appl. No. 16/294,646, Examiner Interview Summary dated Jun. 30, 2021, 1 pg.
U.S. Appl. No. 16/294,646, Non-Final Office Action dated Feb. 22, 2021, 23 pgs.
U.S. Appl. No. 16/294,646, Notice of Allowance dated May 28, 2021, 13 pgs.
U.S. Appl. No. 16/294,654, Corrected Notice of Allowance dated Jun. 30, 2021, 10 pgs.
U.S. Appl. No. 16/294,654, Examiner Interview Summary dated Jun. 1, 2021, 1 pg.
U.S. Appl. No. 16/294,654, Examiner Interview Summary dated Jun. 30, 2021, 1 pg.
U.S. Appl. No. 16/294,654, Non-Final Office Action dated Feb. 22, 2021, 26 pgs.
U.S. Appl. No. 16/294,654, Notice of Allowance dated Jun. 1, 2021, 13 pgs.
U.S. Appl. No. 16/294,654. Examiner Interview Summary dated Mar. 29, 2021, 2 pgs.

* cited by examiner

DECENTRALIZED IDENTITY METAVERSE DATABASE SYSTEM

FIELD OF TECHNOLOGY

This patent document relates generally to cloud computing environments, and more specifically to the secure management of personally identifying information in cloud computing environments involving a metaverse.

BACKGROUND

The term "metaverse" refers to an immerse virtual-reality computing experience that allows users to interact with a computer-generated environment and other users. A metaverse may be combined with augmented reality. For example, a user may wear a virtual reality headset, which may present a virtual overlay on a physical environment. The user may then interact with both the physical environment and the virtual overlay.

A metaverse may be implemented on or in connection with a cloud computing environment. "Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Storing personally identifying information is necessary for many cloud computing and metaverse applications. For example, personally identifying information may be associated with users of a cloud computing environment and used to perform operations such as verifying identity or authorizing a user to perform a task. However, the distribution and storage of personally identifying information involves certain risks, such as the risk that the information is publicly leaked.

BRIEF DESCRIPTION OF THE DRAWINGS

The included drawings are for illustrative purposes and serve only to provide examples of possible structures and operations for the disclosed inventive systems, apparatus, methods and computer program products for secure identity management. These drawings in no way limit any changes in form and detail that may be made by one skilled in the art without departing from the spirit and scope of the disclosed implementations.

DETAILED DESCRIPTION

Figure 1:
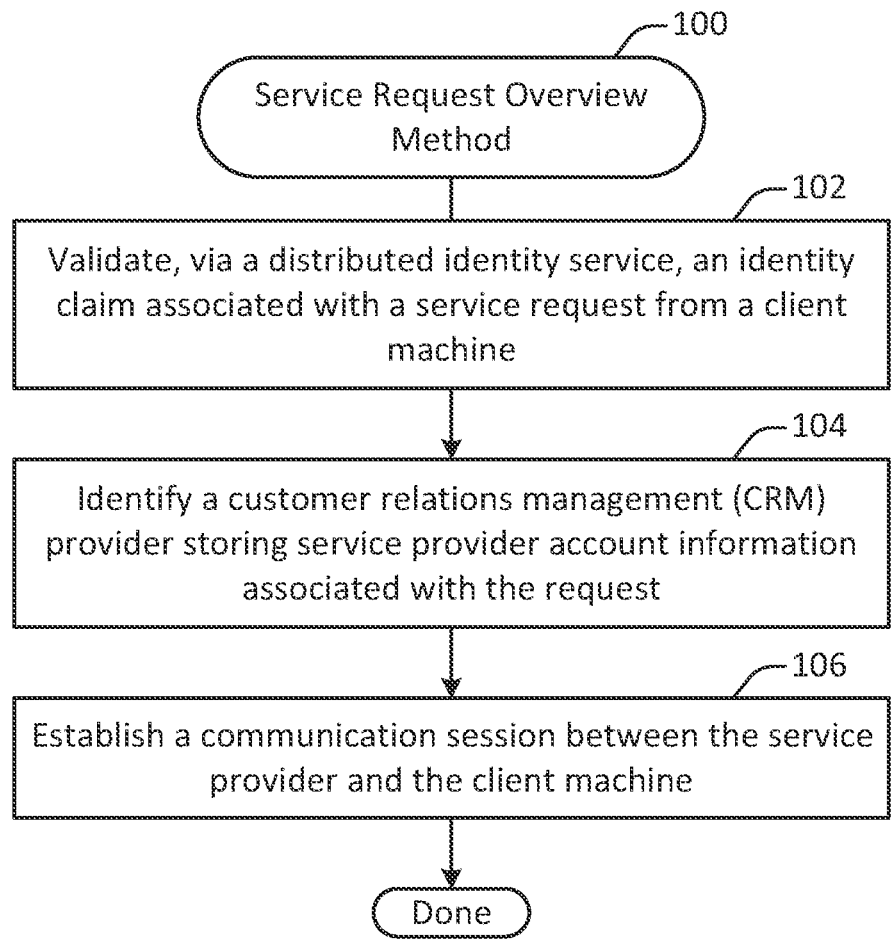
FIG. 1 illustrates an example of an overview method, performed in accordance with one or more embodiments.

According to various embodiments, techniques and mechanisms described herein facilitate the secure and distributed processing of service requests in a metaverse. Information about a user's identity may be validated using a distributed identity service. Validated identify information may then be used to query one or more customer relations management (CRM) services to identify a CRM account associated with the user. The CRM account may then be used to connect the user with a service provider in such a way that the user's identity may remain opaque to the metaverse service provider, the CRM service provider, or both.

Consider the situation of individuals. In the physical world, an individual often substantiates his or her identity with documents like a driver's license. Such documents assert facts about the individual such as name, age, or eye color. However, driver's licenses don't exist on the Internet. In network-centric models in which information is decentralized, the problem grows exponentially as users must deal with many siloed systems. This decentralization results in users' information being replicated and occasionally hacked or leaked, compromising privacy and undermining security. This problem exists for virtually any kind of private information related to virtually any kind of entity.

Privacy problems are compounded in a metaverse, where an individual may interact with a variety of entities such as business through a metaverse service provider. When using conventional techniques, because the metaverse service provider may act as an intermediary between the individual and the entities, over time the metaverse service provider may be able to accumulate a comprehensive view of the user, including a substantial amount of data that the user may prefer to keep private. That is, in addition to the siloed systems each storing various private information associated with a user, the metaverse provider may over time accumulate close to a superset of the information stored in the siloed systems.

A decentralized identity system facilitates the identification of an entity across different systems that are in a distributed decentralized network. However, conventional decentralized identity suffers from various problems. First, many identification schemes involve usernames and passwords, which typically result in replicating data (mostly out-of-sync) in different identity silos around the network. This is referred to as the Proximity Problem. Second, digital identity can be aggregated in identity hubs providing single sign-on, such as Google or Facebook, but most places (e.g., websites or computing environments) do not use such providers. This is referred to as the Scale Problem. Third, conventional identity solutions are limited by fixed database schema or attribute sets for the identified items, which is referred to as the Flexibility Problem. Fourth, conventional identity solutions rely on collections of personally identifying information for an entity, often collected without knowledge. This data is replicated over and over again in different systems, with universal identifiers such as Social Security Numbers or phone numbers used to correlate identity information, again without a subject's knowledge. This is referred to as the Privacy Problem. Fifth, the data in the many silos is often shared with others without consent, often for the benefit of the organization who controls the silo. This is referred to as the Consent Problem.

As the world moves toward network-centric information models, each system will have its own set of information for an entity. This information needs to be matched up in the decentralized world to produce a decentralized id (DID) so that the network can establish a complete view of that entity. Traditional approaches to solve this problem use standard mechanisms that involve matching and merging information and lead to many centralized hubs creating a siloed effect.

In contrast to conventional approaches, techniques and mechanisms described herein provide an identification mechanism by consensus where an entity can be identified without sharing private information and duplicating data across various systems. Techniques and mechanisms described herein also facilitate the maintaining of personal control over digital information and the application of consent-based rules to information sharing.

Consider the use case of Alexandra, who is attempting to address a problem with her modem. When using conventional techniques, Alexandra would need to identify and call her internet service provider with a phone. Alexandra would then need to manually provide identification information, a process which creates opportunities for phishing attacks and other types of malicious activities. Finally, Alexandra would need to describe to a support technician the status of her equipment, a process which often renders technical support activities less effective since the support technician cannot actually see or interact with malfunctioning devices.

When using techniques and mechanisms described herein, Alexandra may instead view her malfunctioning modem with augmented reality glasses connected with a metaverse. Alexandra may connect to the metaverse via a partially anonymized connection in which she is identified based on information associated with a decentralized identity service. When Alexandra indicates that she would like to initiate a support request for the modem, the metaverse may scan the visual information captured by Alexandra's glasses to determine an identifier (e.g., a MAC address) for the modem. The metaverse may then verify Alexandra's identify claim via a decentralized identity service, which can provide validated identity information without revealing to the metaverse unnecessary information about Alexandra. The combination of the validated identity information and the modem identifier may then be used to query one or more CRM providers. When a CRM provider identifies the validated identity information and the modem identifier as being linked with an account associated with a service provider accessing CRM services via the CRM provider, then the CRM provider may connect Alexandra with the service provider. Such a connection may result in, for example, a support technician from the service provider joining Alexandra in the metaverse and being able to view the modem from Alexandra's perspective, facilitating more rapid and accurate technical support.

Techniques and mechanisms described herein differ substantially and provide numerous advantages over conventional decentralized identity management techniques. For example, Sovrin is a decentralized, global public utility for managing a lifetime portable identity for any person, organization, or thing. Sovrin architecture involves combination of a public DLT for identity operated by permissioned nodes governed by a global non-profit foundation. However, the Sovrin system assumes that the issuer has verified the information, which is untrue in many business contexts and which presents significant scaling problems as the network grows. In contrast, techniques and mechanisms described herein provide for identity verification and management even when member nodes rely at least in part on unverified information.

As another example, conventional log-based blockchain systems may be used for identity verification and management. However, in such an approach, logs grow without limit because the blockchain maintains the entire record of transactions rather than the realized state of the transactions. In conventional log-based blockchain systems, the only mechanism for communications is via transactions against the log. Such messages are stored forever and can add up very quickly. Further, the data that those messages contain is stored forever in the log, potentially creating a possibility of exploitation. Storing data in this way may even violate data privacy regulations, since deleting the data involves appending a delete request to the log rather than actually removing data from the log. Another problem with immutable logs, a feature of conventional log-based blockchain identity management solutions, is that the query data is exposed. If the blockchain is used to represent the query process, then the query metadata will forever be on the chain and directly traceable to individuals.

In contrast, techniques and mechanisms described herein involve storing the realized state of the transactions (e.g., in a Merkle database), which grows toward a stable log size as the size of the replicated data becomes stable. The reduction in log size means that there is less data to replicate across the system for new members to join the network. In addition, new members can start participating in query execution and result production without having to replicate the transaction log first. Also, requested results can be served by other members while replication proceeds in parallel, solving synchronization problems in lifecycle decisions. Further, when information is stored in an editable shared database rather than a log, the information can be deleted as necessary. Thus, although techniques and mechanisms described herein may be used in conjunction with blockchain technology, for instance to store the information in the trust ledger, the architectural differences from conventional techniques address many of the drawbacks of conventional identity management approaches. Another advantage of embodiments described herein is that although query data is replicated throughout the system, the data stored as the results of previous queries can be minimized so that the personally identifying information inherent in the queries themselves does not "leak" out of the system. For example, the query metadata does not need to be transmitted throughout the system.

According to various embodiments, techniques and mechanisms described herein involve a two-pronged approach for identification. A gossip protocol in combination with zero-knowledge proofs may be used to determine a consensus as to an entity's identity. The gossip may be based on results evaluated based on the information available. The architecture may be based on a federation of pools configured with a delegation pattern to retrieve local identity information from individual networks and provide the results to the main network that maintains a global identity.

According to various embodiments, the system may construct and execute a query to identify an entity on a field-by-field basis. The system may then evaluate candidates that match any field on a field-by-field basis to generate a confidence score. If an identity is found that exceeds a predetermined threshold, then the request may be designated as valid. For many requests, only one identity can score high enough to be valid. However, but in the event that the request validates as more than one identity, the higher scoring identity may be chosen.

FIG. 1 illustrates an example of service request overview method 100, performed in accordance with one or more embodiments. The method 100 may be performed at one or more components within a distributed computing system, such as the system 200 discussed with respect to FIG. 2. For example, the method 100 may be performed at a metaverse service provider.

According to various embodiments, the method 100 may be performed in order to coordinate activity between a client machine, one or more customer relations management (CRM) providers, one or more service providers, a distributed identity service, and a metaverse provider. This coordination may allow the client machine to establish a communication session with a service provider (1) without providing personally identifying information to the metaverse provider, (2) without identifying a service provider to the metaverse provider, and/or (3) without personally identifying information being provided to the CRM provider.

At 102, an identity claim associated with a service request from a client machine is validated via a distributed identity service. According to various embodiments, the distributed identity service may include a plurality of identity nodes in communication via the internet. Each identity node may have access to some types of personally identifying information about potentially many different individuals. However, the identity nodes may not share this information directly with one another. Instead, the identity nodes may communicate via, for instance, a gossip protocol to respond to granular queries to associate individual data items with network identifiers. In this way, the identity node may validate an identity claim without sharing information about the individual with other identity nodes and without other identity nodes disclosing personally identifying information about the individual. Techniques and mechanisms related to distributed identity services are discussed throughout the application, and particularly with respect to FIGS. 4-9.

At 104, a CRM provider storing service provider account information associated with the request is identified. According to various embodiments, the CRM provider may be identified by querying a variety of CRM providers using a network identifier and service information associated with the service request. Because the network identifier cannot be used to retrieve personally identifying information about the user associated with the account, such queries can be performed while sharing relatively little information.

According to various embodiments, the nature of the service information may depend on the type of service being requested. For example, the service information may include a product identifier such as a MAC address on a modem, a serial number, a brand name, a product model, an account number, or other such data. In some situations, more than one piece of information may be included.

Once a service provider has been identified by way of a customer relations management provider responding to the query, a communication session may be established between the service provider and the client machine at 106. In some embodiments, the communication session may be conducted via virtual reality, augmented reality, or mixed reality, for instance via a metaverse. Alternatively, or additionally, the communication session may be conducted via chat, voice call, video call, email, or another type of communication method. Additional details regarding the identification of a CRM provider and the establishment of a communication session with a service provider are described with respect to FIGS. 2 and 3.

Figure 2:
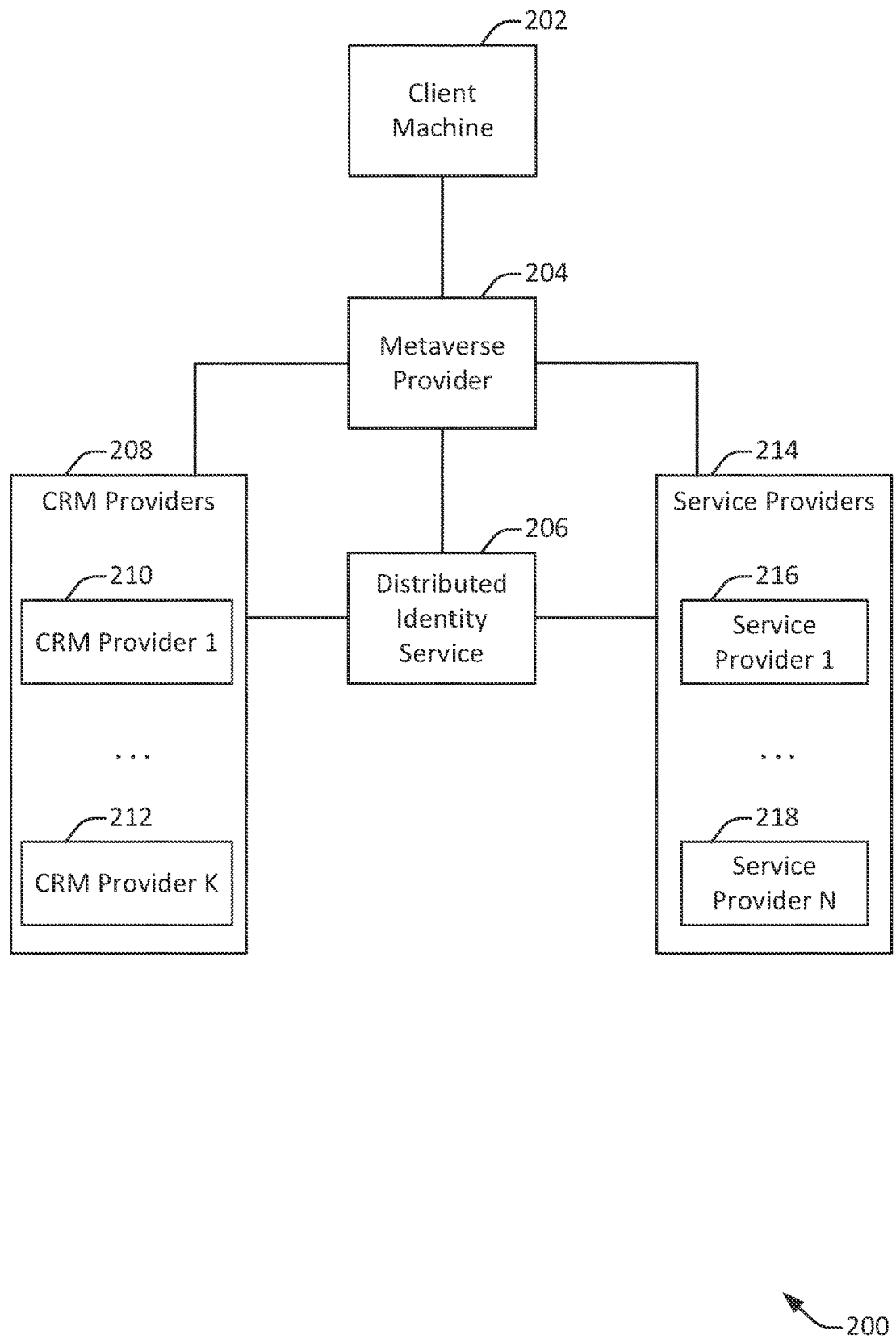
FIG. 2 illustrates an example of an arrangement of components in a distributed computing system, configured in accordance with one or more embodiments.

FIG. 2 illustrates an example of an arrangement of components in a distributed computing system 200, configured in accordance with one or more embodiments. According to various embodiments, the distributed computing system 200 may be used, in conjunction with other techniques and mechanism described herein, to perform a method such as the method 100 shown in FIG. 2 and/or the method 300 shown in FIG. 3.

The distributed computing system 200 includes a client machine 202 in communication with a metaverse provider 204. The metaverse provider is in turn in communication with a distributed identity service 206, one or more CRM providers 208, and one or more service providers 214. The CRM providers 208 include the CRM provider 1 210 through the CRM provider K 212. The service providers 214 include the service provider 1 216 through the service provider N 218.

According to various embodiments, the CRM providers may be implemented in various ways. For example, a CRM provider may be implemented as a centralized service that is accessible via an endpoint controlled by the CRM provider. As another example, a CRM provider may be implemented as a decentralized or distributed service that is accessible via more than one endpoint. As yet another example, an oracle may act as an aggregator for more than one CRM provider and may serve as an endpoint for accessing information stored in the CRM providers.

According to various embodiments, the client machine 202 may be any one or more computing devices configured to provide access to a metaverse. For example, the client machine 202 may include a virtual reality, mixed reality, or augmented reality device such as a headset. The virtual reality or augmented reality device may be in communication with another computing device such as a mobile phone, laptop computer, and/or desktop computer. As another example, the client machine 202 may be a computing device such as a mobile phone or laptop computer without an associated virtual reality, mixed reality, or augmented reality device. That is, any suitable configuration of one or more client machines may be used.

The metaverse provider 204 may be any provider of a metaverse experience. For example, the metaverse provider may be a centralized service such as that provided by Meta. As another example, the metaverse provider may be a decentralized service such as a blockchain-based peer-to-peer virtual space system.

According to various embodiments, a metaverse experience may be a virtual, augmented, or mixed reality environment in which users can interact with one another. For example, a metaverse may involve a virtual world that users can navigate. In some portions or configurations, the virtual world may be independent of the real world. In other portions or configurations, the virtual world may be overlain on or otherwise mixed with the real world. For example, users may view digital artifacts such as avatars of one another overlain on the physical world. As another example, users may view the physical world through each others viewpoints such as cameras on mobile computing devices, headsets, laptop computers, or other suitable devices.

According to various embodiments, the distributed identity service 206 may be an identity node in a distributed identity network. The identity node may coordinate with other identity nodes to validate information about a user's identity without revealing information to the other identity nodes. An example of such a configuration is shown in the system 500 in FIG. 5, while an example of an identity node is shown at 502 in FIG. 6. Techniques and mechanisms related to distributed identity verification are discussed throughout the application, and specifically with respect to FIGS. 4-9.

According to various embodiments, the CRM providers 208 may include one or more providers of on-demand customer relations management services. Such service providers may include, but are not limited to: Salesforce, Microsoft, and Amazon. A CRM provider may provide CRM services to a number of service providers via the internet. For example, different internet service providers such as Comcast and AT&T may each manage their interactions with customers at least in part via one or more of the CRM providers.

In some embodiments, a CRM provider may provide services beyond those included in a narrow definition of CRM. For example, a CRM provider may provide services such as sales management and/or service management. As another example, a CRM provider may provide one or more of a variety of cloud computing services to client individuals and/or business entities.

In some implementations, a CRM provider may store a relatively limited amount of information about at least some individuals. For example, consider a configuration in which Comcast employs a CRM provider to manage information about its customers. To increase privacy and reduce opportunities for data leakage, Comcast may store some or all of the personally identifying information about its customers in a different location, outside the CRM provider. Within the CRM provider Comcast may store account information such as a distributed identity service identifier, a modem linked to the distributed identity service identifier, a Comcast account identifier, and other less sensitive information. In this way, Comcast may access CRM services via the CRM provider while maintaining control over personally identifying information about its customers.

According to various embodiments, the service providers 214 include business entities employing one or more of the CRM providers to store CRM information about customers of the service provider. For example, service providers may include utility providers, retail stores, wholesale stores, digital service providers, or other purveyors of goods and/or services.

Figure 3:
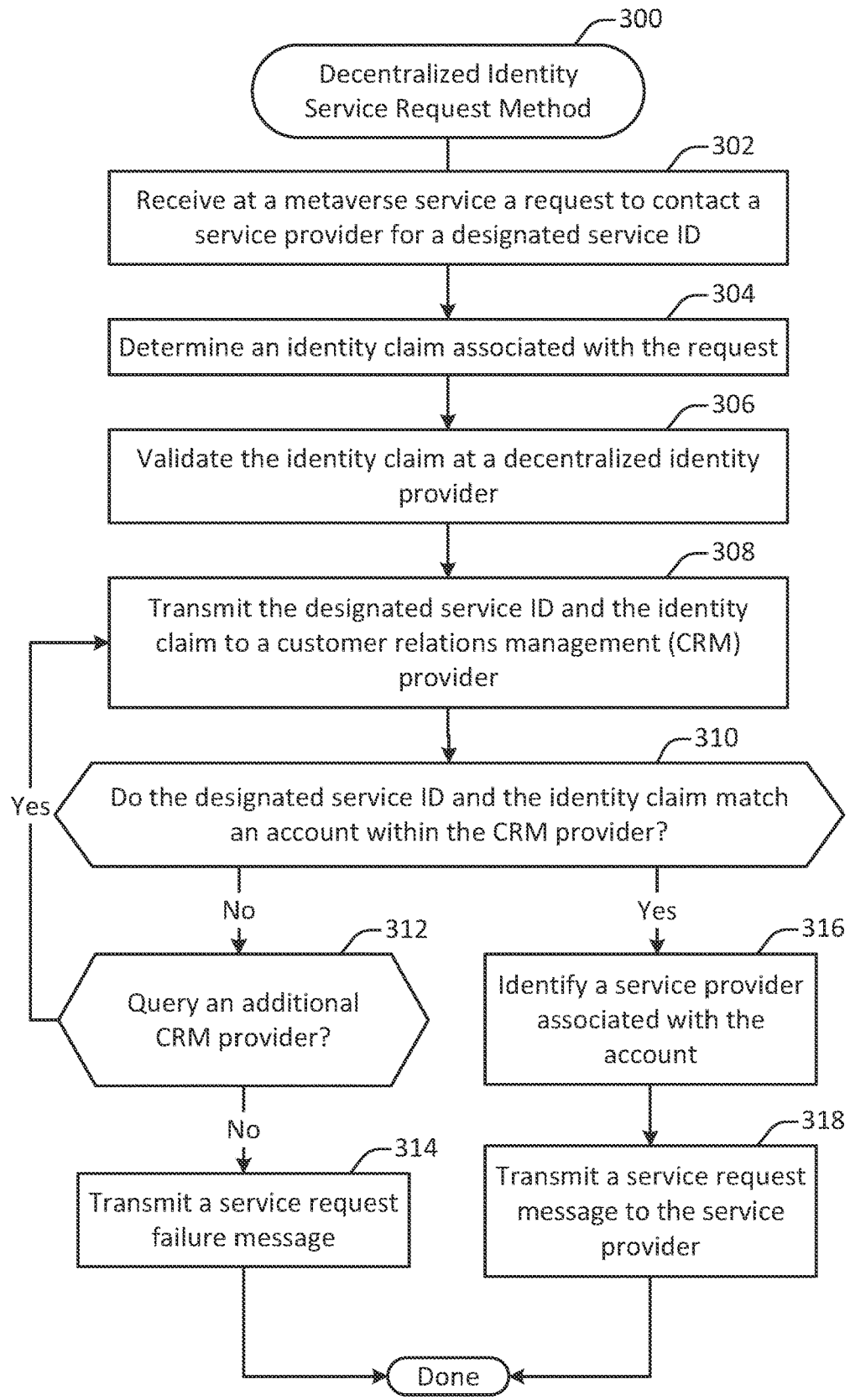
FIG. 3 illustrates an example of an method for implementing a decentralized identity service request, configured in accordance with one or more embodiments.

FIG. 3 illustrates an example of a method 300 for implementing a decentralized identity service request, configured in accordance with one or more embodiments. The method 300 may be performed at one or more components within a distributed computing system, such as the system 200 discussed with respect to FIG. 2. For example, the method 300 may be performed at a metaverse service provider.

At 302, a request to contact a service provider for a designated service ID is received at a metaverse service. According to various embodiments, the request may be generated at a client machine. The client machine may receive user input indicating that the user would like to initiate a service request. The user input may be provided via a user input device such as a touch screen, keyboard, or mouse, and may be generated from within a virtual, mixed, or augmented reality environment.

According to various embodiments, the designated service ID may include one or more of any of a variety of information that may help to identify a service provider and an account at the service provider with which a user is associated. The types of information that may be included in a designated service ID may include, but are not limited to: a product ID, an account ID, a service ID, a serial number, a one dimensional bar code, and a two-dimensional bar code.

According to various embodiments, information may be provided in any of various ways. For example, a service ID may be determined by applying image processing techniques to image data captured by a camera operated by the user. As another example, a service ID may be entered via a keyboard, mouse, touch screen, or other use input device. As yet another example, a service ID may be determined by processing audio information provided by the user.

In particular embodiments, other information may be included in addition to a designated service ID. Such information may include, but is not limited to: audio information, video information, product characteristics, and service characteristics. For example, a user may capture image or video data of a device for which service is requested. As another example, a user may provide audio information describing a type of product (e.g., a kitchen appliance) for which service is requested.

An identity claim associated with the request is received at 304. According to various embodiments, the identity claim may include one or more data values provided by the user. The data values may include any information that may be used to identify a user. Such information may include personally identifying information such as an email address, phone number, physical address, or other such data. Alternatively, or additionally, information that is not personally identifying may be provided. Collectively the provided information may be used to determine a network identifier for the user.

In particular embodiments, information associated with an identity claim may already be known to the metaverse system. For example, the user may access the metaverse system via a partially anonymized account that is associated with a limited set of information about the user. That information may then serve as the basis of the user's identity claim without the user having to manually provide it when making a service request.

The identity claim is validated at a decentralized identity provider at 306. Techniques for validating an identity claim at a decentralized identity provider are discussed throughout the application, such as with respect to the FIGS. 4-9. For example, the data values may be transmitted to an identity node associated with the metaverse provider. That identity node may then communicate with other identity nodes to validate the identity claim without revealing information about the user account to those other identity nodes.

The designated service ID and the identity claim are transmitted at 308 to a CRM provider. According to various embodiments, the metaverse provider may communicate with a variety of different CRM providers. Each CRM provider may provide CRM services for potentially many different service provider. Each service provider may in turn store with the CRM provider account information for potentially many different accounts.

According to various embodiments, the CRM providers may be contacted in any of various ways. For example, a CRM provider may be implemented as a centralized service accessed via a single endpoint. As another example, a CRM provider may be implemented as a distributed or decentralized service accessible via more than one endpoint. As yet another example, an oracle may serve as and endpoint and aggregate communications with more than one CRM provider.

A determination is made at 310 as to whether the designated service ID and the identity claim match an account within the CRM provider. Such a determination may be made by comparing the designated service ID and the validated identity claim to account information stored at the CRM provider. For example, the CRM provider may perform an internal query to identify a potential match.

In some implementations, the internal query may be performed across potentially many different service providers. That is, because the CRM provider does not know the actual identity of the user associated with the service request, nor even the identity of the service provider being requested, nor even whether the CRM provider is storing information relevant to the service request, executing the internal query may involve querying information associated with many different service providers.

In some embodiments, the internal query may be performed in a relatively focused fashion. For example, if it is known through additional information provided at 302 that the service request pertains to a particular appliance (such as a dishwasher) or service (such as internet service), then the CRM provider may query account information associated with service providers that may potentially provide services responsive to such a service request.

If the designated service ID and the identity claim do not match an account within the decentralized service provider, then at 312 a determination is made as to whether to query an additional CRM provider. In some embodiments, additional CRM providers may continue to be queried until either all suitable providers have been queried or a match has been found. If a match is not found, then a service request failure message may be transmitted to the client machine at 314.

If a CRM provider finds a match between the designated service ID and associated identity claim and account information stored at the CRM provider, then at 316 a service provider associated with the account information may be identified. According to various embodiments, the service provider may be identified at the CRM provider by identifying the service provider in the CRM provider database that is associated with the query match.

A service request message is transmitted to the service provider at 318. In some embodiments, the service provider identity may be provided to the metaverse provider, which may in turn contact the service provider. Alternatively, or additionally, the CRM provider may contact the service provider directly.

According to various embodiments, transmitting the service request message may involve establishing a communication session between the client machine and the service provider. In some embodiments, the communication session may flow through the metaverse provider. Alternatively, or additionally, the service provider may directly contact the user associated with the client machine.

In some implementations, the communication session may be conducted at least in part via the metaverse. For example, a support technician may join the user's locale within the metaverse. At this point, the support technician may appear to the user as an avatar within the metaverse. At the same time, the support technician may be able to view image and/or audio data captured from the user's equipment. If the user is wearing augmented or virtual reality equipment such as a headset, the support technician may be able to view the situation from the user's perspective. Further, the support technician may be able to communicate with the user via audio, text, gestures, chat, or other means.

According to various embodiments, the operations shown in FIG. 3, and indeed in any method described in this application, may be performed in an order different from that shown. For example, the operations 308 and 310 may be performed in parallel, allowing multiple CRM providers to be queried simultaneously.

Figure 4:
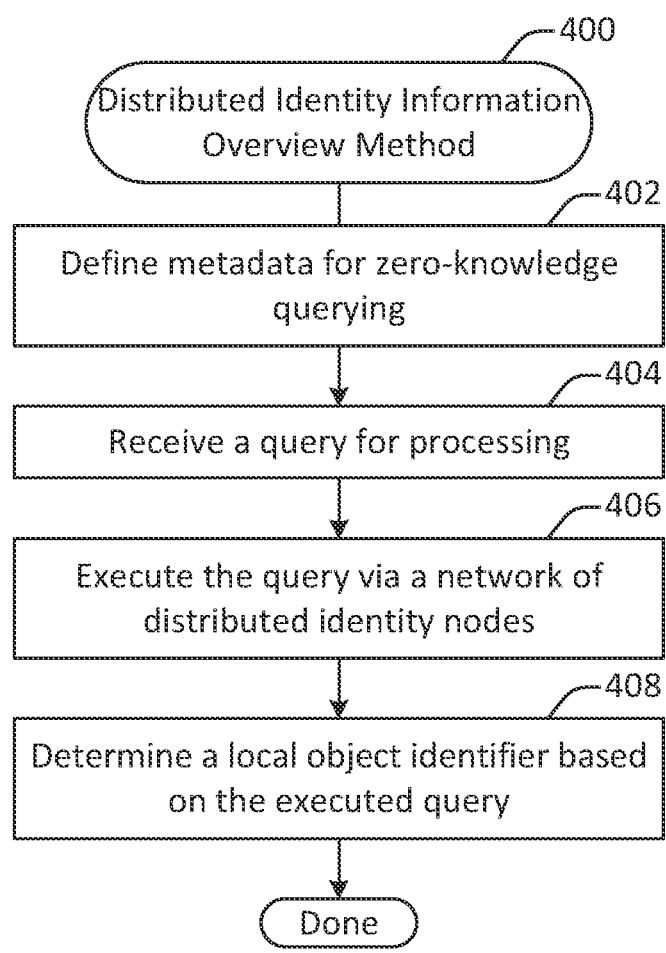
FIG. 4 illustrates an example of a distributed identify verification overview method, performed in accordance with one or more embodiments.

FIG. 4 illustrates an example of a decentralized identity overview method 400, performed in accordance with one or more embodiments. According to various embodiments, the method 400 may be performed at one or more components within one or more computing services environments. For example, the method 400 may be performed at one or more nodes in communication via a network.

At 402, metadata for zero-knowledge querying is defined. In some embodiments, metadata for zero-knowledge querying may be defined by an administrator. For example, an administrator may create a data object template that includes one or more fields to be used for identification of an instance of an item represented by the data object. An example of a system that may be used to facilitate zero-knowledge querying is discussed with respect to FIG. 5.

According to various embodiments, defining metadata for zero-knowledge querying may involve specifying one or more characteristics of an item to be identified, which is represented as a data object. For example, an individual may be represented as a data object having fields such as a first name, a last name, an age, a birthday, a mailing address, one or more email addresses, one or more social networking accounts, and/or a social security number. As another example, an organization may be represented as a data object having fields such as a name, a legal form (e.g., C-corporation, S-corporation, limited liability corporation, non-profit, etc.), a state of incorporation, a mailing address, a headquarters address, a chief executive officer, and/or one or more email addresses. As yet another example, a vehicle may be represented as a data object having fields such as a body style, a color, a vehicle identification number, a make, and/or a model.

At 404, a query is received for processing. According to various embodiments, the query may include one or more data values associated with an item to be identified. The item may correspond with a data object template created as discussed with respect to operation 402. Each data value may correspond with a metadata entry associated with an instance of the data object. For example, when identifying a person, the query may include any or all of a first name, a last name, a social security number, one or more email addresses, and/or one or more social media accounts.

In particular embodiments, the query may be generated when some or all of the information included in the query has not been verified by the local system at which the query is received. For example, a particular campus within a university system may need to validate the identify of a person who supplies a first name, a last name, a social security number, and an email address. The campus may be able to verify that the person has access to the email address, for instance by sending a confirmation email. However, the campus may not be able to verify that the social security number corresponds to the person associated with that email address. Accordingly, the campus may generate a query to validate the person's identity via zero-knowledge querying.

Figure 6:
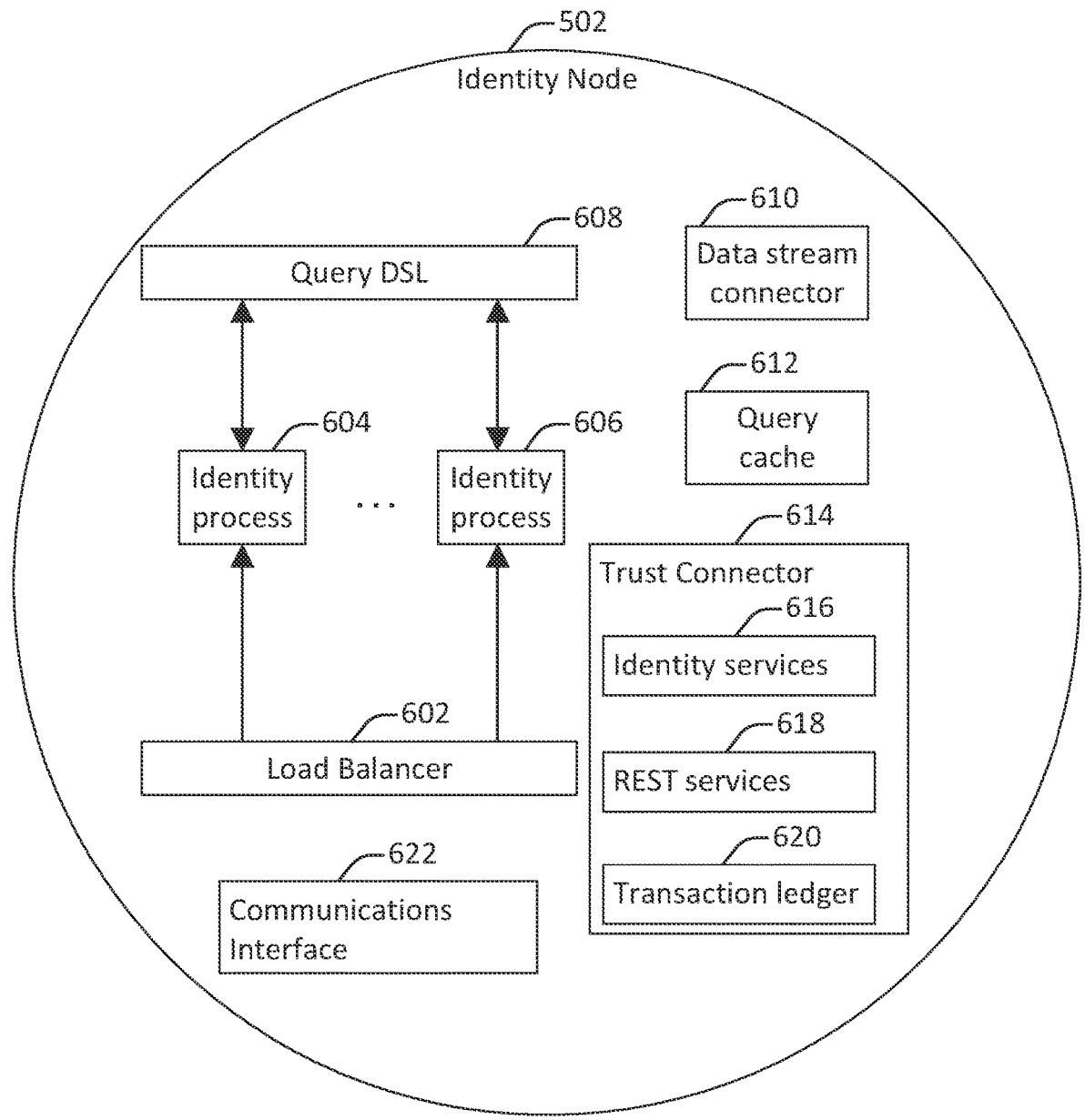
FIG. 6 illustrates an example of an identity node, configured in accordance with one or more embodiments.
Figure 7:
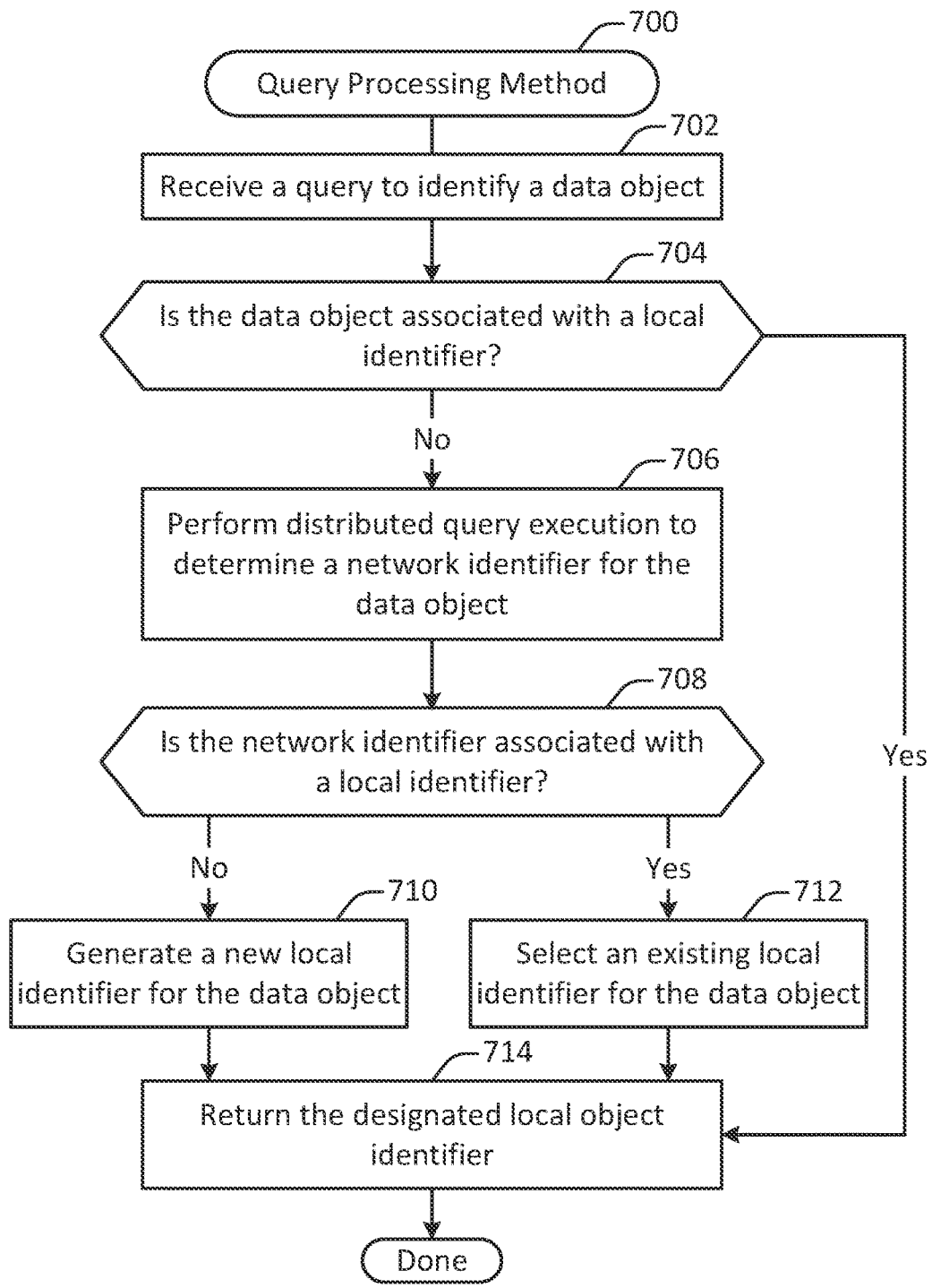
FIG. 7 illustrates an example of a method for query processing, performed in accordance with one or more embodiments.

In some implementations, the query may be received at a zero-knowledge identity node associated with the campus. FIG. 6 illustrates an example of an identity node, configured in accordance with one or more embodiments. FIG. 7 illustrates an example of a method 700 for processing such a query.

At 406, the query is executed via a network of distributed identity nodes. According to various embodiments, some or all of the distributed identity nodes may each receive a copy of the query. A node that receives the query may then investigate the identity of the item represented by the query using its own local resources. After performing such an inquiry, the node may then communicate with other distributed identity nodes to resolve the identity. The communication may occur via a technique such as a gossip protocol, which is a type of peer-to-peer communication that can be used to route data to the members of a group without necessarily involving a central registry to coordinate the action. Techniques for executing a query among distributed identity nodes are discussed in additional detail with respect to the methods 800 and 900 shown in FIGS. 8 and 9.

A local object identifier based on the executed query is determined at 408. According to various embodiments, the local object identifier provides a way for the local system that generated the query to identify the object associated with the query. The local object identifier may map to a global object identifier that is produced by the execution of the query at 406. In this way, information associated with the query may be validated against information known by other nodes in the distributed identity network without sharing information among those nodes. Techniques for determining a local object identifier are discussed in additional detail with respect to the method 700 shown in FIG. 7.

Figure 5:
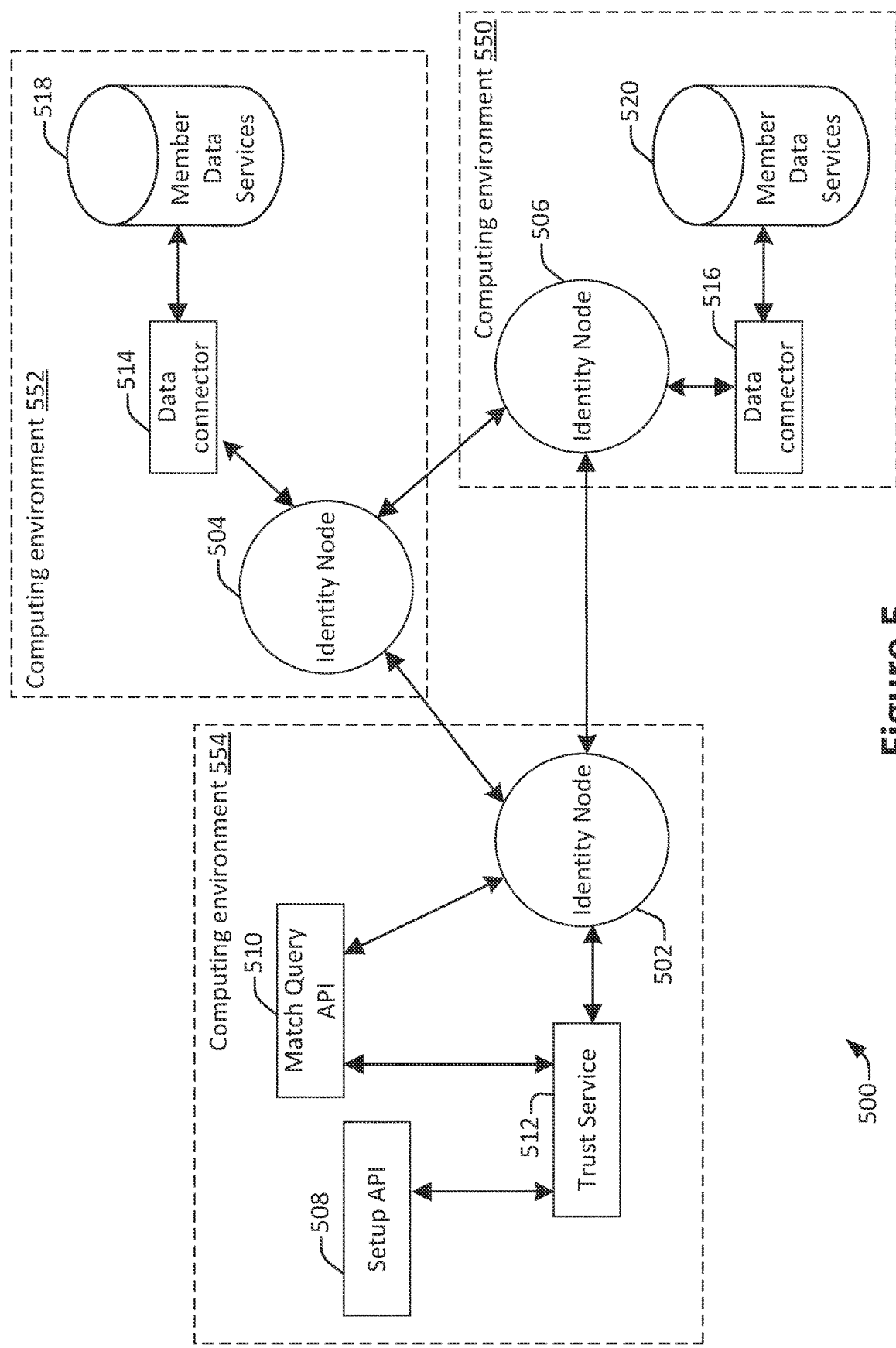
FIG. 5 illustrates an example of an arrangement of components in a distributed computing system, configured in accordance with one or more embodiments.

FIG. 5 illustrates an example of an arrangement of components in a distributed computing system 500, configured in accordance with one or more embodiments. The distributed computing system 500 includes identity nodes 502, 504, and 506, a setup API 508, a match query API 510, a trust service 512, data connectors 514 and 516, and member data services 518 and 520.

In some implementations, the setup API 508 may be used to define metadata for zero-knowledge querying. For example, as discussed with respect to operation 402 in FIG. 4, an administrator may create a data object template that includes one or more fields to be used for identification of an instance of an item represented by the data object. Alternately, a data object template may be automatically created, for instance based on a data object type associated with data objects stored in a local database.

According to various embodiments, the trust service 512 may provide a mechanism for sharing trusted information among the identity nodes. The trust service 512 may store information such as a network identifier that uniquely identifies a data object. The trust service 512 may also store one or more data values associated with the data object. For example, in the case of a person the trust service 512 may store a user identifier as well as a name, a social security number, and one or more email addresses associated with the person. The trust service 512 may store data values for only some of the data fields associated with the object, and need not need not store data values for all fields associated with the object. For example, some fields may be used to store information that has not yet been associated with the data object within the network.

In particular embodiments, the trust service 512 may be implemented at least in part via a hashed database such as a hash tree (e.g., a Merkle tree). In such a configuration, an identity node may be able to query the database to verify that information is present and/or associated with a given identifier. For example, given a network identifier for an item such as a person and a piece of information such as a social security number, a computing system may query the trust service 512 to determine whether the network identifier is associated with the social security number.

In particular embodiments, the trust service 512 may not be used to extract information. For example, given a network identifier, a computing system may not query the trust service 512 to identify a social security number corresponding to the network identifier. Similarly, given a social security number, a computing system may not query the trust service 512 to identify a network identifier corresponding to the social security number. In this way, the hashed, one-way nature of the trust service 512 may facilitate the maintenance of information privacy while at the same time permitting information verification.

In some implementations, the setup API 508 communicates with the trust service 512. For instance, the setup API 508 may configure the trust service 512 for verifying a particular type or types of item or items.

According to various embodiments, the match query API 510 may be used to generate identity queries to transmit to the identity node 502 for execution. For example, the match query API 510 may receive information about an item to be identified. If the information includes a network identifier, then the match query API may use the network identifier to query the trust service 512 to verify the information. If instead the information does not include a network identifier, or if some of the information cannot be validated via the trust service, the match query API 510 may communicate with the identity node 502 to execute a distributed query across potentially many identity nodes.

In particular embodiments, the setup API 508 and/or the Match Query API 510 may be configured as a REST (Representational State Transfer) API. In such a configuration, entities may access the API to perform operations and access information by using a uniform and predefined set of stateless operations.

Figure 8:
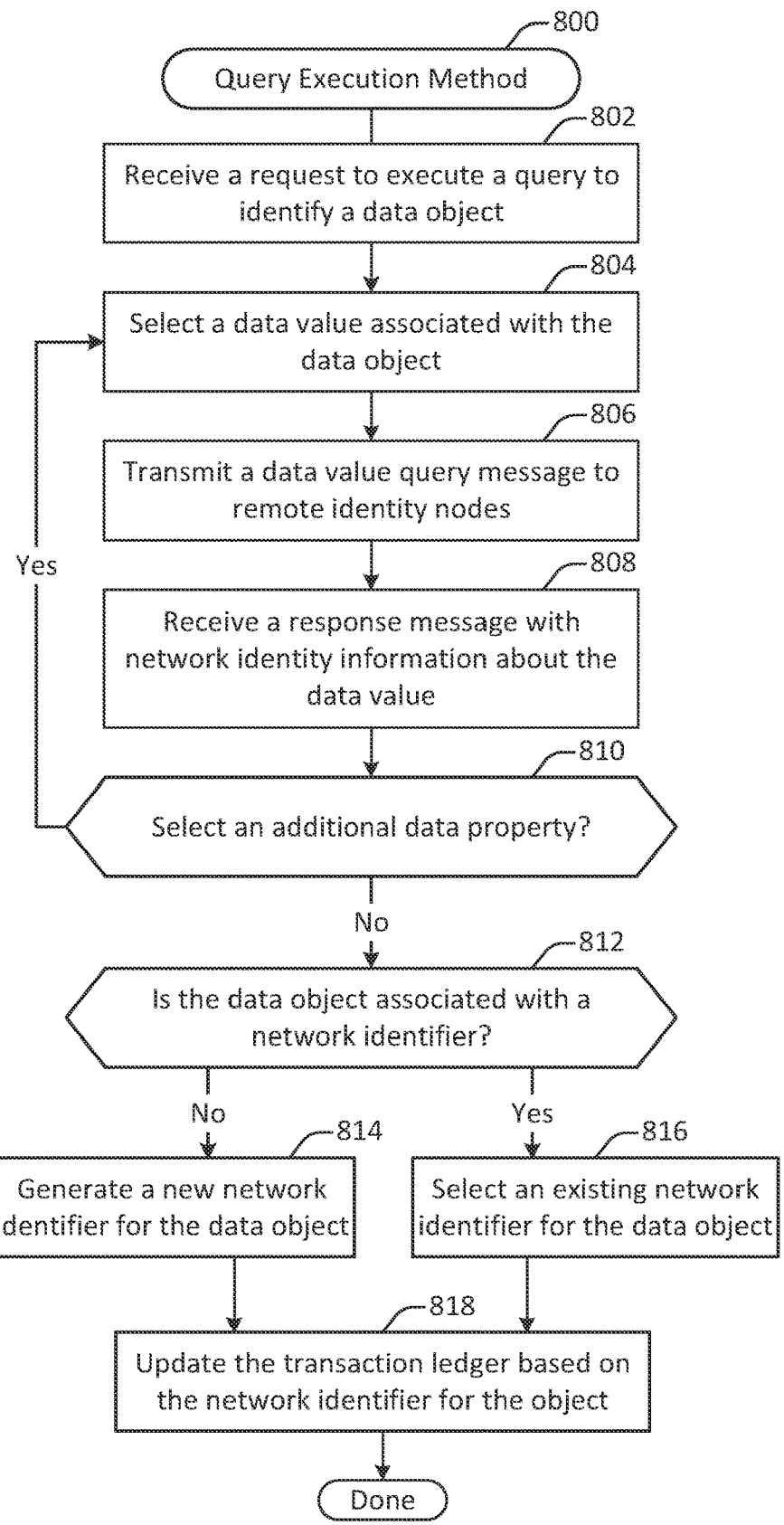
FIG. 8 illustrates an example of a method for distributed query execution, performed in accordance with one or more embodiments.

According to various embodiments, each identity node is responsible for performing a variety of operations related to identity management. For example, the identity node 502 may receive identity queries from the match query API 510 and then communicate with other identity nodes to execute the query. FIG. 7 illustrates an example of a method 700 for processing a query. As another example, the identity node 502 may receive identity queries from other identity nodes and then participate in the execution of that query. FIG. 8 illustrates an example of a method 800 for executing a query.

According to various embodiments, the member data services 518 and 520 include repositories of information that may be used to identify items. Each member data service may correspond to one or more databases associated with an entity or organization. For example, member data services 518 may correspond to user accounts at Microsoft, while member data services 520 may correspond to user accounts at Google. As another example, member data services 518 may correspond to user accounts for one or more services offered by a cloud computing system, while member data services 520 may correspond to a different one or more services offered by the same cloud computing system. As still another example, member data services 518 may correspond to user accounts associated with one or more entities within a cloud computing system, while member data services 520 may correspond user accounts associated with a different one or more entities within the same cloud computing system.

According to various embodiments, computing environments 550, 552, and 554 may correspond with different entities or organizations. For example, the computing environment 550 may correspond with Microsoft, while the computing environment 552 may correspond with Google. Alternately, different computing environments may correspond with different portions of the same entity or organization.

In particular embodiments, different member data services may store different information about the same item. For example, a user may be associated with a name and an email address. However, the user's social security number may be stored in association with the user in member data services 518, while the user's home address may be stored in association with the user in member data services 520. In this example, if the user provides her social security number for storage in the computing environment 550, techniques and mechanisms described herein may allow the computing environment 550 to verify that the social security is known to correspond with the user.

In some implementations, verification may be performed while maintaining privacy and data security in other respects. For example, the computing environment 552 need not transmit the user's social security number directly to the computing environment 550. As another example, the computing environment 550 may not be able to determine which of the distributed identity nodes or other computing environments knew the user's social security number. As another example, the computing environment 550 may not be able to use the social security number to obtain other information about the user that the user did not provide to the computing environment 550.

According to various embodiments, the data connectors 514 and 516 may be used to query the member data services 518 and 520. For instance, the data connectors may provide APIs to the identity nodes for interacting with member data services. A data connector may be adapted to communicate with a specific member data services repository, since different member data services repositories may be configured differently.

In some implementations, different identity nodes may be associated with the same organizational entity. For example, a cloud computing service provider may be associated with multiple data service repositories that each maintains different identity information. These different data service repositories may be associated with different identity nodes. As another example, a single member data service repository may be associated with multiple identity nodes, for instance for load balancing.

For the purpose of illustration, the system 500 is shown as including three identity nodes and three computing environments. However, in various embodiments the system 500 may include hundreds or thousands of identity nodes and/or computing environments. Similarly, for the purpose of illustration the system 500 is shown as having data connectors and member data services in communication with the identity nodes 504 and 506, while identity node 502 is in communication with the match query API 510 and the trust service 512. However, in various embodiments any identity node may be in communication with one or more match query APIs, trust services, data connectors, setup APIs, and/or member data services. For the purpose of illustration, the system 500 is shown as having one-to-one relationships between various components. However, in various embodiments various components may be arranged in one-to-many or many-to-many relationships.

According to various embodiments, identity nodes may communicate with one another at least in part via a gossip protocol. Because digital communications networks such as the internet typically do not support multicasting a message to all members of a group at once, the number of point-to-point communication channels between nodes in a network grows with the square of the number of nodes. Gossip communication provides an alternative, probabilistic approach, working as an epidemic of information. Gossip messages spread quickly throughout the members of a network, with the number of "hops" between members on the order of log(N) to reach all network members, where N is the number of nodes.

In some implementations, gossip communication may be used to support any of a variety of operations discussed herein. For instance, gossip communication may be used to distribute either or all of query messages, consensus messages, and result messages between identity nodes. In the case of consensus messages, gossip communication can be used to facilitate consensus on potentially conflicting identity information. Gossip communication can also be used to spread the result of a query across the entire network.

FIG. 6 illustrates an example of an identity node 502, configured in accordance with one or more embodiments. The identity node 502 includes a load balancer 602, identity processes 604 through 606, a query domain-specific language (DSL) 608, a data stream connector 610, a query cache 612, and a trust connector 614. The trust connector 614 includes identity services 616, REST services 618, and a transaction ledger 620.

According to various embodiments, the identity node 502 may be implemented on one or more computing devices in a cloud computing environment. For example, the identity node 502 may be executed within a virtual machine in a cloud computing environment such as Amazon Web Services (AWS), Microsoft Azure, or Google Cloud.

According to various embodiments, the load balancer 602 divides identity query execution requests for processing among a number of different processes. FIG. 6 shows two processes 604 and 606 for the purpose of illustration. However, any suitable number of processes may be used. Each process is configured to execute one or more identity query requests. For example, a process may perform operations such as retrieving or storing information in the query cache 612, communicating with member data services via the query DSL 608 and/or data stream connector 610, communicating with the trust connector 614, and/or communicating with other identity nodes via the trust connector 614.

In some implementations, the query DSL 608 may be used to translate queries from the language common to the identity nodes to a domain-specific language for queries or Lambda functions that the client uses to connect to information. For example, Microsoft may store item information in one type of database, while Google may store item information in another type of database. The translated queries may then be sent to the member data services via the data stream connector 610.

In some embodiments, the query cache 612 may maintain a record of queries sent to the member data services along with the results of those queries. In this way, the identity node need not repeatedly query the member data services for the same information over a short time span. Instead, such information may be retrieved from the query cache 612. However, the identity node may also periodically refresh the information stored in the query cache 612 to capture changes that have occurred in the member data services. For instance, the query cache 612 may be used to limit queries for the same information to a period of once per hour, once per day, or some other time interval.

According to various embodiments, the trust connector 614 may be used to facilitate communications between the identity node 602 and the trust service 512. The identity services module 616 may be used to perform identity queries. For example, the identity services module 616 may receive a query that includes a network identifier and one or more pieces of information. The identity services module 616 may then query the transaction ledger module 620 to determine if the information is associated with the network identifier.

In some implementations, the REST services 618 may be used to update the transaction ledger 620. For instance, when it is determined that a piece of information is associated with a network identifier, the transaction ledger 620 may be updated to include a hash of the information that is associated with the network identifier. In this way, the identity services 616 may later be used to determine if the piece of information is associated with the network identifier by hashing the information and comparing it with the information stored in the ledger. In some instances, a piece of information may be disassociated with a network identifier. For instance, the piece of information may later be associated with a different and conflicting network identifier.

In some embodiments, the transaction ledger 620 may communicate with the trust service 512 to store a realized state of the transactions adding or removing information in association with various network identifiers. Such information may be modified by the REST services 618 and queried by the identity services 616. In particular embodiments, trusted information may be stored in the transaction ledger via blockchain.

According to various embodiments, the communications interface 622 may be used to support communication between the different identity nodes. For example, the identity nodes may communicate to share queries for execution, to gossip about query results, or to communicate information about the trust ledger 620.

FIG. 7 illustrates an example of a method 700 for query processing, performed in accordance with one or more embodiments. According to various embodiments, the method 700 may be performed in order to process a query to validate information about an item. The method 700 may be performed at one or more components in a computing environment, such as the computing environment 554 shown in FIG. 5.

A query to identify a data object is received at 702. In some implementations, the query may be received at the match query API 510 shown in FIG. 5. The query may include information that may be associated with a data object but that may need to be verified. For example, a website user may request to create a user account and may provide information such as a name, an email address, and a social security number.

At 704, a determination is made as to whether the data object is associated with a local identifier. In some implementations, the determination may be made by querying a database local to the computing environment 554. If all of the information associated with the query is linked to the same local identifier, then additional verification may not need to be performed. If instead some or all of the information associated with the query is not linked to a local identifier, then the information may be verified.

Distributed query execution is performed at 706 to determine a network identifier for the data object. As part of the distributed query execution, the match query API 510 may retrieve metadata from the trust service 512. The metadata may indicate information such as which fields are associated with the data object. The match query API 510 may use this information to formulate the query or queries. The query or queries may then be distributed to identity nodes throughout the network. Additional details regarding distributed query execution are discussed with respect to the methods 800 and 900 shown in FIGS. 8 and 9.

In some instances, distributed query execution need not be performed for one or more data values. For example, one or more data values may be validated based on communication with the trust ledger, for instance when the information associated with the data object is already stored in the trust ledger. Alternately, or additionally, the query execution process may involve one or more queries to member data services, for instance when some or all of the information associated with the data object is not yet stored in the trust ledger.

A determination is made at 708 as to whether the network identifier is associated with a local identifier. The match query API 510 may maintain a correspondence table between network identifiers stored in the transaction ledger and known to the trust service 512, and local identifiers that identify data objects within the local computing environment. For example, a person may have a network identifier that identifies the person within the trust ledger, and a local identifier for each computing environment in which the person has an account.

If the network identifier is not associated with a local identifier, then a new network identifier may be generated at 710. If instead the network identifier is already associated with a local identifier, then the existing local identifier is selected at 712. According to various embodiments, generating a new local identifier may involve one or more of a variety of operations. For example, a new local user account or other object representation may be created. As another example, a new entry may be created in the correspondence table discussed with respect to operation 708.

At 714, the designated local identifier is returned. The designated local identifier may then be used by the computing environment to perform further processing. In some implementations, the method 700 may also return an indication as to which pieces of information associated with the data object have been verified. For example, the system may be able to verify a social security number associated with a user account, but not an address. In some instances, a lack of verification may prompt the computing environment to require additional information from the user, such as supporting evidence for the information. Alternately, or additionally, the computing environment may simply treat some information as unverified.

FIG. 8 illustrates an example of a method 800 for distributed query execution, performed in accordance with one or more embodiments. According to various embodiments, the method 800 may be performed at one or more components within a computing system, such as the identity node 502 shown in FIG. 5.

At 802, a request to execute a query to identify a data object is received. In some implementations, the request may be generated as part of a query processing method such as the method 700 shown in FIG. 7. For example, the request may be generated at operation 706. The request may include information such as one or more data values associated with the data object.

A data value associated with the data object is selected at 804. According to various embodiments, the data values may be selected in any suitable order, such as in sequence, at random, or in parallel.

A data value query message is transmitted to one or more remote identity nodes at 806. In some implementations, the data value query message may be transmitted to all of the identity nodes. Alternately, the data value query message may be transmitted to only a portion of the identity nodes.

In particular embodiments, the data value query message may be batched and/or interleaved with other data value query messages. In this way, a recipient of the data value query message may be unable to correlate the messages to determine from the messages alone that different data values are associated with the same data object. Thus, the transmission of the data value query messages to the remote identity nodes may occur in an order different than that shown in FIG. 8. For example, batches of data value query messages may be transmitted at regular intervals (e.g., once per second, once per millisecond, once per minute, etc.) or when a designated number of such requests have been received.

In some implementations, the data value query message may include only a limited amount of information. For example, the data value query message may identify only the type of data object and type of data value associated with the query.

In some implementations, the data value query message may be transmitted in such a way that the origin of the data value query message is disguised. For example, the identity nodes may employ a gossip protocol to transmit messages, and the data value query message may be transmitted along with the retransmission of other messages received from other identity nodes.

A response message with network identity information about the data value is received at 808. According to various embodiments, the response message may identify a network identifier associated with the data value if one exists. Alternately, or additionally, the response message may indicate that the data value is not associated with an existing network identifier. The network identity information may be determined via a distributed process involving a plurality of identity nodes. Additional details regarding such a process are discussed with respect to the method 900 shown in FIG. 9.

A determination is made at 810 as to whether to select an additional data property. As discussed with respect to the operation 804, data properties may be selected for querying in any suitable order.

A determination is made be made at 812 as to whether the data object is associated with one or more existing network identifiers. In some implementations, the determination may involve determining whether any of the response messages received at 808 include a network identifier associated with any one of the data values selected at 804.

If the data object is not associated with an existing network identifier, then a new network identifier for the data object is generated at 814. According to various embodiments, the new network identifier may then be associated with some or all of the information associated with the data objects.

In some embodiments, the new network identifier may be associated only with those data values that have been independently verified. For example, the new network identifier may be associated with an email address that has been verified by transmitting a verification email, to which the user responds to clicking a link or transmitting a response.

If the data object is associated with an existing network identifier, then an existing network identifier is selected for the data object at 816. In some situations, only a single network identifier may be identified. For example, only a single data value may have been selected at 804 for verification. As another example, multiple data values may have been selected at 804, but the response message for each data value received at 808 may have indicated the same network identifier as being associated with the different data values.

In some implementations, more than one network identifier may be identified. For example, a person's address may be associated with one network identifier, while the person's social security number may be associated with a different network identifier, for instance if the address and social security number had never been linked in a single account. In such a situation, the system may select one of the network identifiers to use, such as the network identifier that was identified as being associated with the greatest number of data values.

At 818, the transaction ledger is updated based on the network identifier for the object. According to various embodiments, the transaction ledger may be updated to include the new network identifier generated at 814 or the network identifier selected at 814. In particular embodiments, updating the transaction ledger to reflect the query result may allow the system to resolve conflicts in an automated, self-healing manner. Over time, successive verification queries for conflicted information may lead the system to converge on a network identifier for the data object. Then, conflicting network identifiers that are associated with only a small portion of data values associated with the object may be removed.

Figure 9:
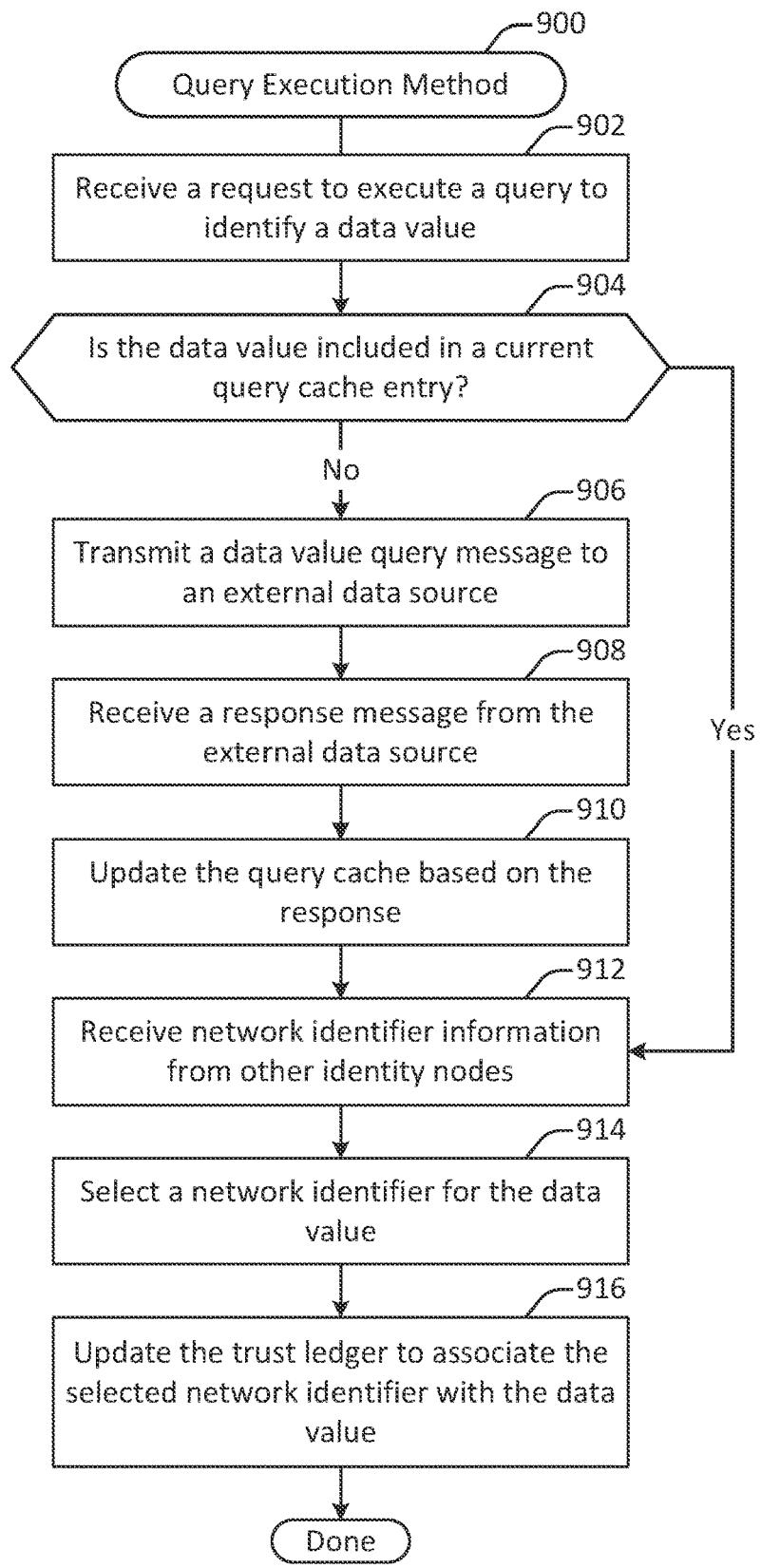
FIG. 9 illustrates an example of a method for remote query execution, performed in accordance with one or more embodiments.

FIG. 9 illustrates an example of a method 900 for remote query execution, performed in accordance with one or more embodiments. According to various embodiments, the method 900 may be executed on an identity node in the network.

In particular embodiments, the method 900 may be performed at a selected one of the identity nodes that has been elected as a "leader" to determine a consensus as to the network identifier based on the distributed queries run by various identity nodes in the system. For example, the leader node may be elected by computing a hash of the data value and consulting a correspondence table that links hash values to leaders. Alternately, any suitable election mechanism may be employed.

In some implementations, some or all of the operations described with respect to FIG. 9 may be executed for each of the queried data values on some or all of the identity nodes in the network. For instance, the identity node on which the method 900 is executed may be the local identity node on which the query is initially received, or it may be a remote identity node located elsewhere in the network.

At 902 a request is received to execute a query to identify a data value. According to various embodiments, the request may be generated as discussed with respect to the operation 806 shown in FIG. 8.

A determination is made at 904 as to whether the data value is included in a current query cache entry. According to various embodiments, the query cache may store queries and query results received from the member data services to avoid repeatedly querying the member data services for the same information over a short time span. Each query result may identify, for example, a data value associated with a data object and a network identifier associated with that data value.

In some implementations, the query cache may include an entry for the data value, but the entry may be outdated. In such a situation, the system may ignore the query cache entry and communicate with the member data services to refresh the query.

A data value query message is transmitted to an external data source at 906. According to various embodiments, the external data source may be a member data services repository such as the repository 518 discussed with respect to FIG. 5. The data value query message may identify the data value and the object type with which the data value is associated.

In some implementations, the data value query message may be transmitted via the query DSL 608 and the data stream connector 610. The query DSL 608 may convert the query into a language specific to the focal member data services repository, while the data stream connector 610 may facilitate the communication between the identity node and the member data services repository.

A response message from the external data source is received at 908. In some implementations, the response message may indicate whether the data value is known to the member data services as being associated with a network identifier. If such an identifier is located, then it may be included in the response message. Otherwise, the response message may include an indication that no such identifier was found.

In particular embodiments, the network identifier may be determined by the member data services querying a database to identify a local identifier associated with the data value. The local identifier may then be used to query a correspondence table that identifies a correspondence between local identifiers and network identifiers. If a corresponding network identifier is found, then it may be included with the response received at 908.

The query cache is updated at 910 based on the response. Updating the query cache may involve storing information such as the query sent to the external data source, the date and time at which the query was sent, and the response received from the external data source, including any network identifier associated with the data value.

Network identifier information is received from other identity nodes at 912. According to various embodiments, the network identifier information may include one or more network identifiers associated with the data value and identified by identity nodes other than the node on which the method 900 is executed.

At 914, a network identifier is selected for the data value. In some implementations, the network identifier may be selected based on consensus. For example, the network identifier received from the greatest number of identity nodes may be selected. As another example, another selection mechanism may be used. For instance, the responses from different identity nodes may be weighted differently, and a weighted average used to select the consensus network identifier. The weighting scheme may depend at least in part based on the query parameters. For instance, if a university seeks to identify a new student at campus A, and the student claims to be already enrolled at campus B, then the identity node at campus B may be upweighted when determining the consensus. In some implementations, identity nodes may communicate using Command Query Responsibility Segregation (CQRS) patterns.

The trust ledger is updated at 916 to associate the selected network identifier with the data value. According to various embodiments, updating the trust ledger may involve communicating with the REST services 618. The REST services 618 may then hash the data value and store the hashed value in the transaction layer in association with the selected network identifier.

In particular embodiments, one or more of the operations shown in FIG. 9 may not be performed by some or all identity nodes. For example, a node not elected as the leader may not perform operations 912-616, and may instead transmit network identity information to the leader.

According to various embodiments, one or more of the techniques and mechanisms described with respect to FIGS. 7-9 or elsewhere herein may be implemented as a continuous workflow. For example, an identity node that has critical information required to identify an unknown item may be down during an attempted query execution for that item. As another example, the member services associated with an identity node may have updated information, rendering a previously-generated response to a query inaccurate. To address such situations, identity nodes may interact in an asynchronous, event-oriented fashion in the form of a continuous workflow, rather than a request/response.

In particular embodiments, a continuous workflow may involve operations such as periodically refreshing results stored in a query cache. When such an operation changes the value stored in the cache, the identity node on which the cache is located may transmit one or more messages to re-execute an identity query for the relevant data value across the network of identity nodes.

In particular embodiments, a continuous workflow may involve operations such as executing queries asynchronously. For instance, in some configurations the identity nodes may take quite a while to come to a consensus about the identity of an item. Accordingly, communication across the network may be conducted in an asynchronous manner.

Figure 10:
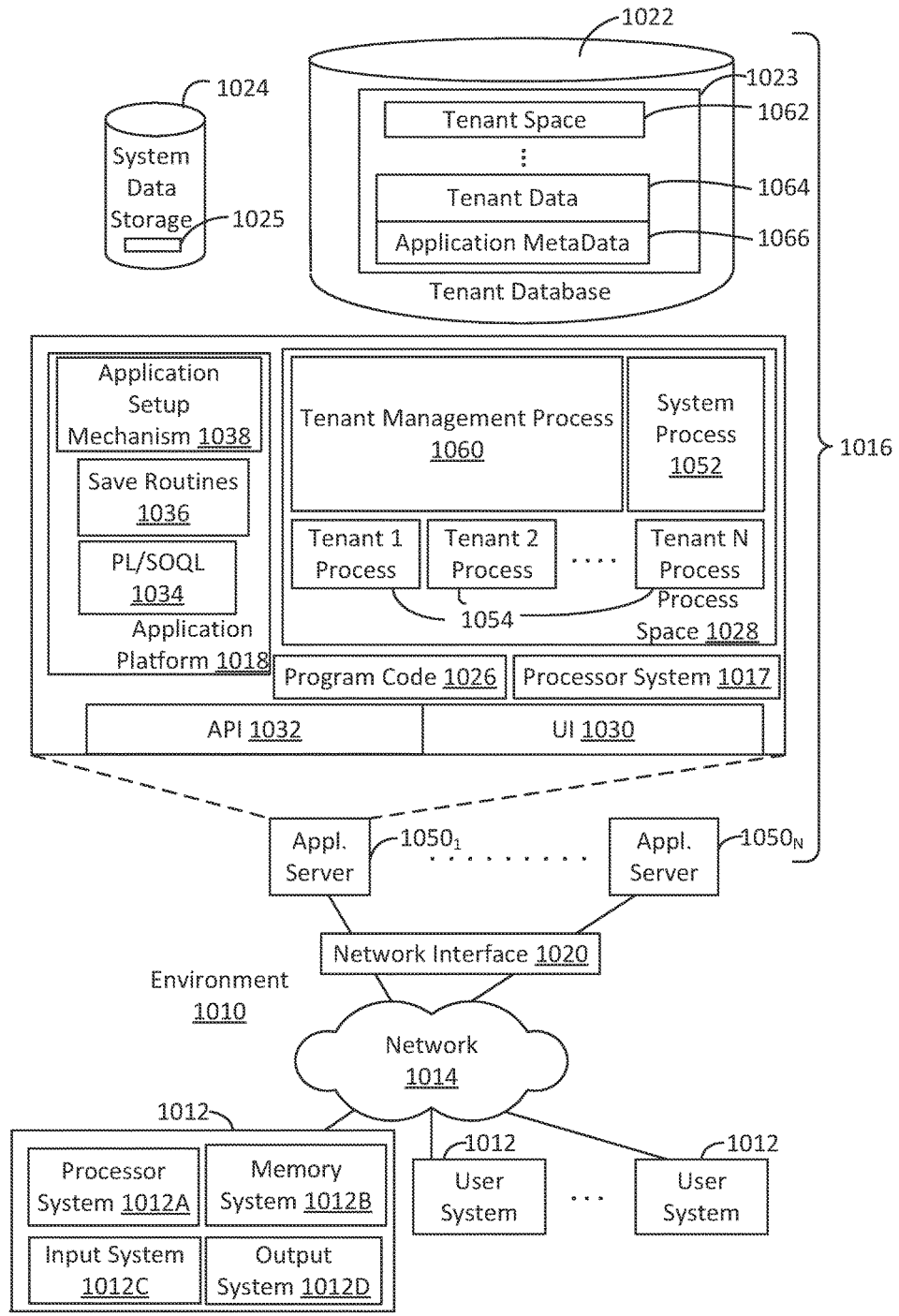
FIG. 10 shows a block diagram of an example of an environment that includes an on-demand database service configured in accordance with some implementations.

FIG. 10 shows a block diagram of an example of an environment 1010 that includes an on-demand database service configured in accordance with some implementations. Environment 1010 may include user systems 1012, network 1014, database system 1016, processor system 1017, application platform 1018, network interface 1020, tenant data storage 1022, tenant data 1023, system data storage 1024, system data 1025, program code 1026, process space 1028, User Interface (UI) 1030, Application Program Interface (API) 1032, PL/SOQL 1034, save routines 1036, application setup mechanism 1038, application servers 1050-1 through 1050-N, system process space 1052, tenant process spaces 1054, tenant management process space 1060, tenant storage space 1062, user storage 1064, and application metadata 1066. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1016, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1018 may be a framework that allows the creation, management, and execution of applications in system 1016. Such applications may be developed by the database service provider or by users or third-party application developers accessing the service. Application platform 1018 includes an application setup mechanism 1038 that supports application developers' creation and management of applications, which may be saved as metadata into tenant data storage 1022 by save routines 1036 for execution by subscribers as one or more tenant process spaces 1054 managed by tenant management process 1060 for example. Invocations to such applications may be coded using PL/SOQL 1034 that provides a programming language style interface extension to API 1032. A detailed description of some PL/SOQL language implementations is discussed in commonly assigned U.S. Pat. No. 10,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 5010, and hereby incorporated by reference in its entirety and for all purposes. Invocations to applications may be detected by one or more system processes. Such system processes may manage retrieval of application metadata 1066 for a subscriber making such an invocation. Such system processes may also manage execution of application metadata 1066 as an application in a virtual machine.

In some implementations, each application server 1050 may handle requests for any user associated with any organization. A load balancing function (e.g., an F5 Big-IP load balancer) may distribute requests to the application servers 1050 based on an algorithm such as least-connections, round robin, observed response time, etc. Each application server 1050 may be configured to communicate with tenant data storage 1022 and the tenant data 1023 therein, and system data storage 1024 and the system data 1025 therein to serve requests of user systems 1012. The tenant data 1023 may be divided into individual tenant storage spaces 1062, which can be either a physical arrangement and/or a logical arrangement of data. Within each tenant storage space 1062, user storage 1064 and application metadata 1066 may be similarly allocated for each user. For example, a copy of a user's most recently used (MRU) items might be stored to user storage 1064. Similarly, a copy of MRU items for an entire tenant organization may be stored to tenant storage space 1062. A UI 1030 provides a user interface and an API 1032 provides an application programming interface to system 1016 resident processes to users and/or developers at user systems 1012.

System 1016 may implement a web-based information verification system. For example, in some implementations, system 1016 may include application servers configured to implement and execute identity verification software applications. The application servers may be configured to provide related data, code, forms, web pages and other information to and from user systems 1012. Additionally, the application servers may be configured to store information to, and retrieve information from a database system. Such information may include related data, objects, and/or Webpage content. With a multi-tenant system, data for multiple tenants may be stored in the same physical database object in tenant data storage 1022, however, tenant data may be arranged in the storage medium(s) of tenant data storage 1022 so that data of one tenant is kept logically separate from that of other tenants. In such a scheme, one tenant may not access another tenant's data, unless such data is expressly shared.

Several elements in the system shown in FIG. 10 include conventional, well-known elements that are explained only briefly here. For example, user system 1012 may include processor system 1012A, memory system 1012B, input system 1012C, and output system 10 12D. A user system 1012 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1012 to access, process and view information, pages and applications available from system 1016 over network 1014. Network 1014 may be any network or combination of networks of devices that communicate with one another, such as any one or any combination of a LAN (local area network), WAN (wide area network), wireless network, or other appropriate configuration.

The users of user systems 1012 may differ in their respective capacities, and the capacity of a particular user system 1012 to access information may be determined at least in part by "permissions" of the particular user system 1012. As discussed herein, permissions generally govern access to computing resources such as data objects, components, and other entities of a computing system, such as an identity verification system, a social networking system, and/or a CRM database system. "Permission sets" generally refer to groups of permissions that may be assigned to users of such a computing environment. For instance, the assignments of users and permission sets may be stored in one or more databases of System 1016. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1016 may provide on-demand database service to user systems 1012 using an MTS arrangement. By way of example, one tenant organization may be a company that employs a sales force where each salesperson uses system 1016 to manage their sales process. Thus, a user in such an organization may maintain contact data, leads data, customer follow-up data, performance data, goals and progress data, etc., all applicable to that user's personal sales process (e.g., in tenant data storage 1022). In this arrangement, a user may manage his or her sales efforts and cycles from a variety of devices, since relevant data and applications to interact with (e.g., access, view, modify, report, transmit, calculate, etc.) such data may be maintained and accessed by any user system 1012 having network access.

When implemented in an MTS arrangement, system 1016 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1016 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1016 may also maintain system-level data usable by multiple tenants or other data. Such system-level data may include industry reports, news, postings, and the like that are sharable between tenant organizations.

In some implementations, user systems 1012 may be client systems communicating with application servers 1050 to request and update system-level and tenant-level data from system 1016. By way of example, user systems 1012 may send one or more queries requesting data of a database maintained in tenant data storage 1022 and/or system data storage 1024. An application server 1050 of system 1016 may automatically generate one or more SQL statements (e.g., one or more SQL queries) that are designed to access the requested data. System data storage 1024 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In particular embodiments, entity tables may correspond to objects that may be verified according to techniques and mechanisms described herein. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 5010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 11A:
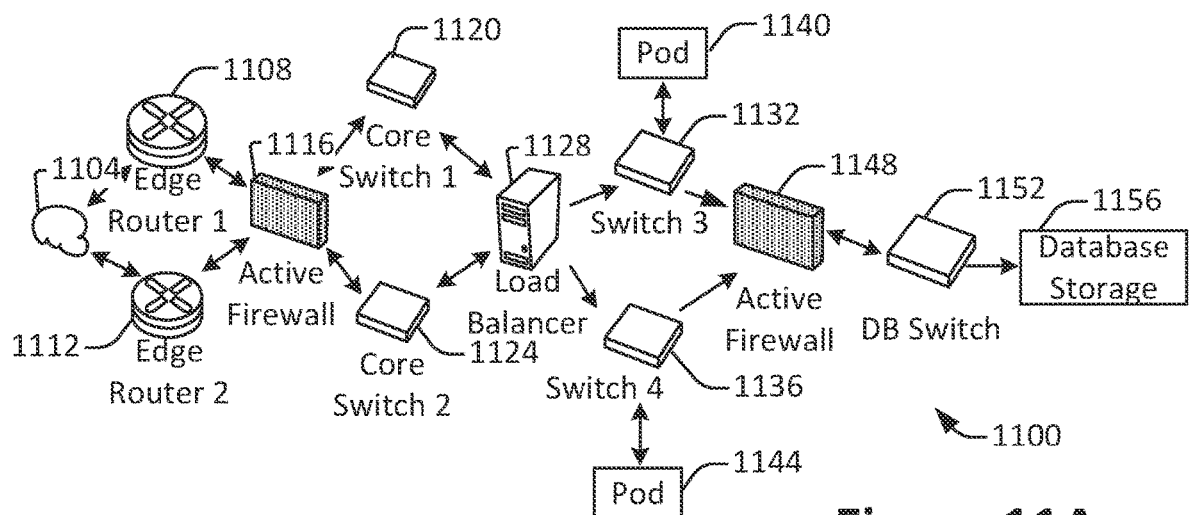
FIG. 11A shows a system diagram of an example of architectural components of an on-demand database service environment, configured in accordance with some implementations.

FIG. 11A shows a system diagram of an example of architectural components of an on-demand database service environment 1100, configured in accordance with some implementations. A client machine located in the cloud 1104 may communicate with the on-demand database service environment via one or more edge routers 1108 and 1112. A client machine may include any of the examples of user systems ?12 described above. The edge routers 1108 and 1112 may communicate with one or more core switches 1120 and 1124 via firewall 1116. The core switches may communicate with a load balancer 1128, which may distribute server load over different pods, such as the pods 1140 and 1144 by communication via pod switches 1132 and 1136. The pods 1140 and 1144, which may each include one or more servers and/or other computing resources, may perform data processing and other operations used to provide on-demand services. Components of the environment may communicate with a database storage 1156 via a database firewall 1148 and a database switch 1152.

Accessing an on-demand database service environment may involve communications transmitted among a variety of different components. The environment 1100 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 11A and 11B.

The cloud 1104 refers to any suitable data network or combination of data networks, which may include the Internet. Client machines located in the cloud 1104 may communicate with the on-demand database service environment 1100 to access services provided by the on-demand database service environment 1100. By way of example, client machines may access the on-demand database service environment 1100 to retrieve, store, edit, and/or process identity verification information.

In some implementations, the edge routers 1108 and 1112 route packets between the cloud 1104 and other components of the on-demand database service environment 1100. The edge routers 1108 and 1112 may employ the Border Gateway Protocol (BGP). The edge routers 1108 and 1112 may maintain a table of IP networks or 'prefixes', which designate network reachability among autonomous systems on the internet.

In one or more implementations, the firewall 1116 may protect the inner components of the environment 1100 from internet traffic. The firewall 1116 may block, permit, or deny access to the inner components of the on-demand database service environment 1100 based upon a set of rules and/or other criteria. The firewall 1116 may act as one or more of a packet filter, an application gateway, a stateful filter, a proxy server, or any other type of firewall.

In some implementations, the core switches 1120 and 1124 may be high-capacity switches that transfer packets within the environment 1100. The core switches 1120 and 1124 may be configured as network bridges that quickly route data between different components within the on-demand database service environment. The use of two or more core switches 1120 and 1124 may provide redundancy and/or reduced latency.

In some implementations, communication between the pods 1140 and 1144 may be conducted via the pod switches 1132 and 1136. The pod switches 1132 and 1136 may facilitate communication between the pods 1140 and 1144 and client machines, for example via core switches 1120 and 1124. Also or alternatively, the pod switches 1132 and 1136 may facilitate communication between the pods 1140 and 1144 and the database storage 1156. The load balancer 1128 may distribute workload between the pods, which may assist in improving the use of resources, increasing throughput, reducing response times, and/or reducing overhead. The load balancer 1128 may include multilayer switches to analyze and forward traffic.

In some implementations, access to the database storage 1156 may be guarded by a database firewall 1148, which may act as a computer application firewall operating at the database application layer of a protocol stack. The database firewall 1148 may protect the database storage 1156 from application attacks such as structure query language (SQL) injection, database rootkits, and unauthorized information disclosure. The database firewall 1148 may include a host using one or more forms of reverse proxy services to proxy traffic before passing it to a gateway router and/or may inspect the contents of database traffic and block certain content or database requests. The database firewall 1148 may work on the SQL application level atop the TCP/IP stack, managing applications' connection to the database or SQL management interfaces as well as intercepting and enforcing packets traveling to or from a database network or application interface.

In some implementations, the database storage 1156 may be an on-demand database system shared by many different organizations. The on-demand database service may employ a single-tenant approach, a multi-tenant approach, a virtualized approach, or any other type of database approach. Communication with the database storage 1156 may be conducted via the database switch 1152. The database storage 1156 may include various software components for handling database queries. Accordingly, the database switch 1152 may direct database queries transmitted by other components of the environment (e.g., the pods 1140 and 1144) to the correct components within the database storage 1156.

Figure 11B:
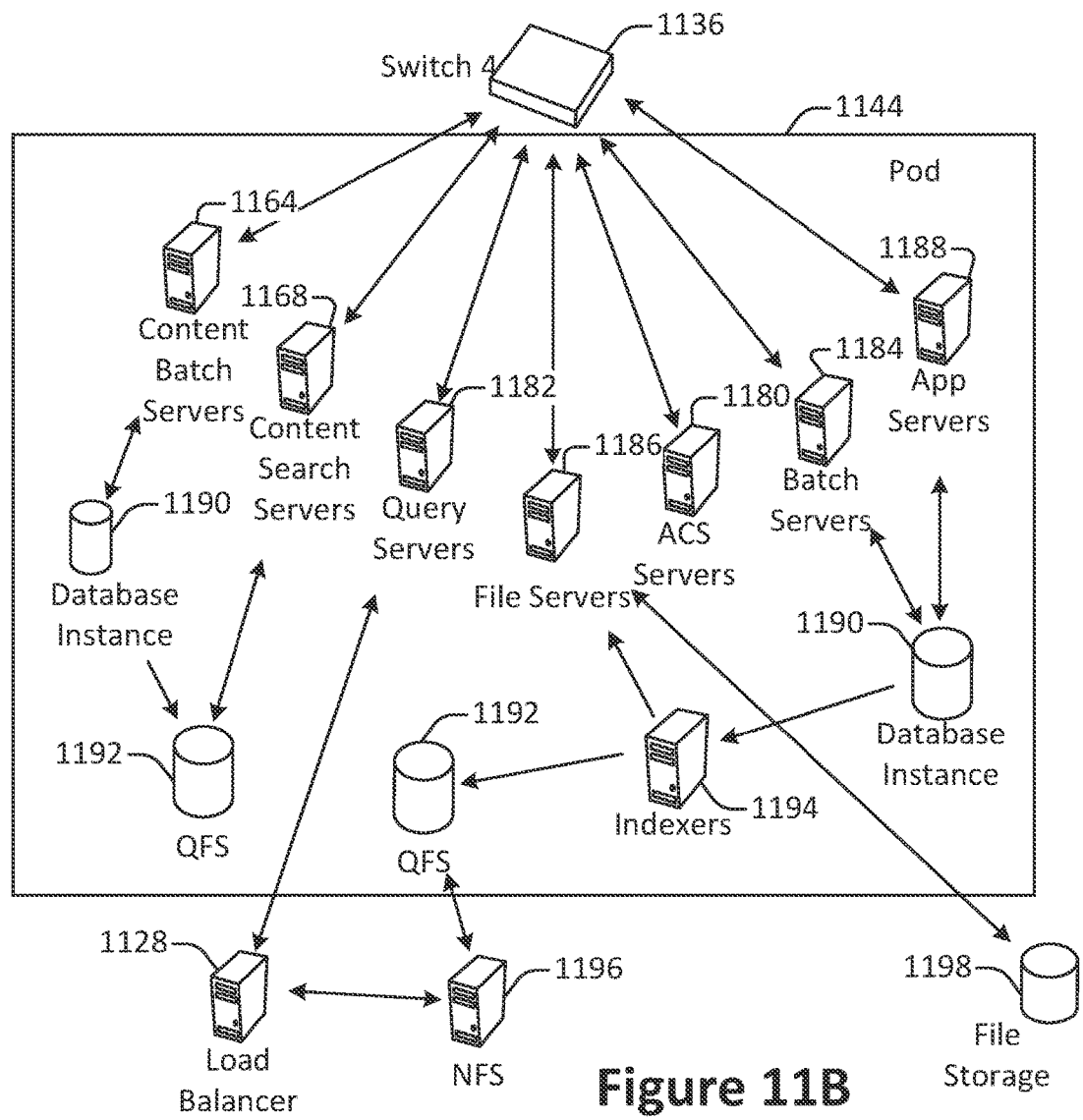
FIG. 11B shows a system diagram further illustrating an example of architectural components of an on-demand database service environment, in accordance with some implementations.

FIG. 11B shows a system diagram further illustrating an example of architectural components of an on-demand database service environment, in accordance with some implementations. The pod 1144 may be used to render services to user(s) of the on-demand database service environment 1100. The pod 1144 may include one or more content batch servers 1164, content search servers 1168, query servers 1182, file servers 1186, access control system (ACS) servers 1180, batch servers 1184, and app servers 1188. Also, the pod 1144 may include database instances 1190, quick file systems (QFS) 1192, and indexers 1194. Some or all communication between the servers in the pod 1144 may be transmitted via the switch 1136.

In some implementations, the app servers 1188 may include a framework dedicated to the execution of procedures (e.g., programs, routines, scripts) for supporting the construction of applications provided by the on-demand database service environment 1100 via the pod 1144. One or more instances of the app server 1188 may be configured to execute all or a portion of the operations of the services described herein.

In some implementations, as discussed above, the pod 1144 may include one or more database instances 1190. A database instance 1190 may be configured as an MTS in which different organizations share access to the same database, using the techniques described above. Database information may be transmitted to the indexer 1194, which may provide an index of information available in the database 1190 to file servers 1186. The QFS 1192 or other suitable filesystem may serve as a rapid-access file system for storing and accessing information available within the pod 1144. The QFS 1192 may support volume management capabilities, allowing many disks to be grouped together into a file system. The QFS 1192 may communicate with the database instances 1190, content search servers 1168 and/or indexers 1194 to identify, retrieve, move, and/or update data stored in the network file systems (NFS) 1196 and/or other storage systems.

In some implementations, one or more query servers 1182 may communicate with the NFS 1196 to retrieve and/or update information stored outside of the pod 1144. The NFS 1196 may allow servers located in the pod 1144 to access information over a network in a manner similar to how local storage is accessed. Queries from the query servers 1122 may be transmitted to the NFS 1196 via the load balancer 1128, which may distribute resource requests over various resources available in the on-demand database service environment 1100. The NFS 1196 may also communicate with the QFS 1192 to update the information stored on the NFS 1196 and/or to provide information to the QFS 1192 for use by servers located within the pod 1144.

In some implementations, the content batch servers 1164 may handle requests internal to the pod 1144. These requests may be long-running and/or not tied to a particular customer, such as requests related to log mining, cleanup work, and maintenance tasks. The content search servers 1168 may provide query and indexer functions such as functions allowing users to search through content stored in the on-demand database service environment 1100. The file servers 1186 may manage requests for information stored in the file storage 1198, which may store information such as documents, images, basic large objects (BLOBS), etc. The query servers 1182 may be used to retrieve information from one or more file systems. For example, the query system 1182 may receive requests for information from the app servers 1188 and then transmit information queries to the NFS 1196 located outside the pod 1144. The ACS servers 1180 may control access to data, hardware resources, or software resources called upon to render services provided by the pod 1144. The batch servers 1184 may process batch jobs, which are used to run tasks at specified times. Thus, the batch servers 1184 may transmit instructions to other servers, such as the app servers 1188, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 12:
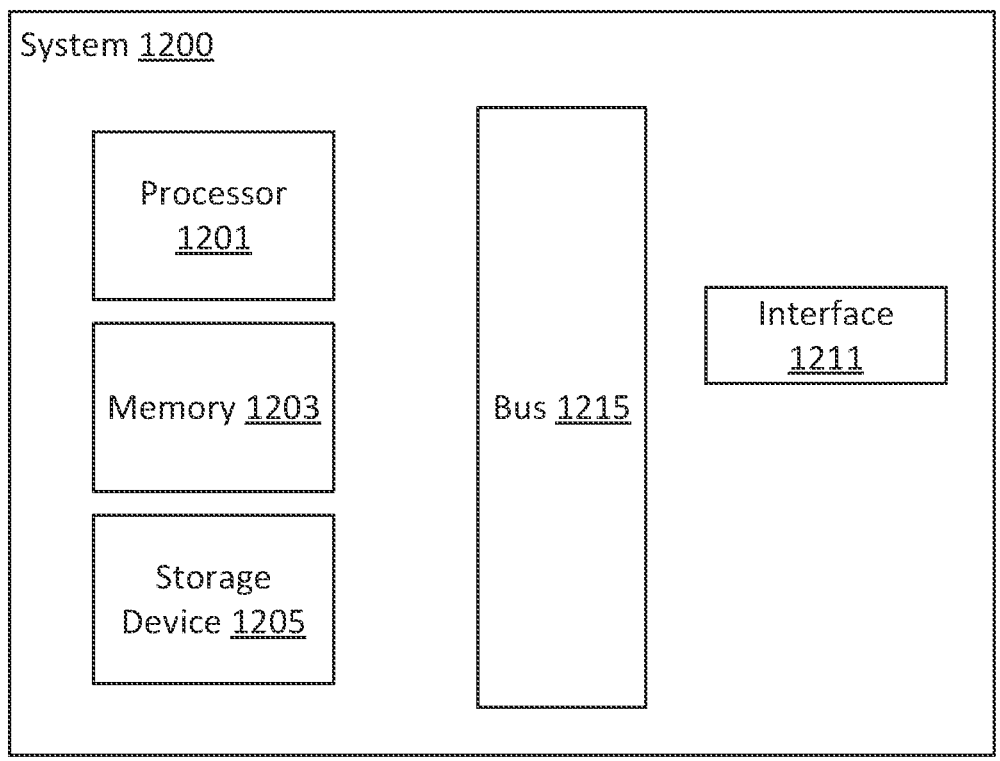
FIG. 12 illustrates one example of a computing device, configured in accordance with one or more embodiments.

FIG. 12 illustrates one example of a computing device. According to various embodiments, a system 1200 suitable for implementing embodiments described herein includes a processor 1201, a memory module 1203, a storage device 1205, an interface 1211, and a bus 1215 (e.g., a PCI bus or other interconnection fabric.) System 1200 may operate as variety of devices such as an application server, a database server, or any other device or service described herein. Although a particular configuration is described, a variety of alternative configurations are possible. The processor 1201 may perform operations such as those described herein. Instructions for performing such operations may be embodied in the memory 1203, on one or more non-transitory computer readable media, or on some other storage device. Various specially configured devices can also be used in place of or in addition to the processor 1201. The interface 1211 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
receiving via a communication interface from a client machine a request to contact a service provider, the request associated with an identity claim and including a service identifier, wherein the request is received at a metaverse provider, and wherein the client machine is configured to present a shared virtual reality experience;
validating the identity claim via a distributed identity service that includes a plurality of identity nodes in communication via a network, wherein validating the identity claim includes determining a designated network identifier associated with a distributed identity account shared among the plurality of identity nodes;
transmitting to a plurality of customer relations management services a service query that includes the service identifier and the designated network identifier; and
establishing a communication session between a service provider remote computing system and the client machine, the communication session including a shared virtual reality interaction between the service provider and the client machine the service provider storing customer relations management information at a designated one of the plurality of customer relations management services, the customer relations management information including the service identifier and the designated network identifier.

2. The method recited in claim 1, the method further comprising:
receiving from the designated customer relations management service a response message indicating that the designated customer relations management service manages an account corresponding with the service identifier and the designated network identifier.

3. The method recited in claim 1, wherein validating the identity claim comprises:
for each of a plurality of data values associated with the identity claim, transmitting a respective object value identification query message that includes the data value to a subset of the plurality of identity nodes via the network; and
for one or more of the data values, receiving a respective object value identification response message that includes a respective network identifier corresponding with the respective data value.

4. The method recited in claim 3, wherein determining the designated network identifier comprises selecting the designated network identifier from among the respective network identifiers.

5. The method recited in claim 4, wherein the designated network identifier is the most common network identifier among the object value identification response messages.

6. The method recited in claim 3, wherein each of the respective network identifiers is determined by consensus among the subset of the plurality of identity nodes.

7. The method recited in claim 3, wherein the plurality of data values are associated with a data object schema, the data object schema identifying one or more data fields associated with an instance of the data object schema, each of the data values corresponding with a respective one of the data fields.

8. The method recited in claim 3, wherein the object value identification query message is transmitted to the identity nodes via a gossip communication protocol defining a peer-to-peer procedure for transmitting information among the identity nodes.

9. The method recited in claim 1, wherein the designated network identifier is stored in a trust ledger shared among the plurality of identity nodes, the trust ledger storing a plurality of network identifiers, each network identifier being associated in the trust ledger with a respective one or more data values.

10. The method recited in claim 9, wherein the respective one or more data values are hashed prior to storing in the trust ledger, the trust ledger capable of being queried to determine any network identifiers associated with a designated hashed data value.

11. A database system implemented via a server system, the server system configurable to cause:
receiving via a communication interface from a client machine a request to contact a service provider, the request associated with an identity claim and including a service identifier, wherein the request is received at a metaverse provider, and wherein the client machine is configured to present a shared virtual reality experience;
validating the identity claim via a distributed identity service that includes a plurality of identity nodes in communication via a network, wherein validating the identity claim includes determining a designated network identifier associated with a distributed identity account shared among the plurality of identity nodes;
transmitting to a plurality of customer relations management services a service query that includes the service identifier and the designated network identifier; and
establishing a communication session between a service provider remote computing system and the client machine, the communication session including a shared virtual reality interaction between the service provider and the client machine the service provider storing customer relations management information at a designated one of the plurality of customer relations management services, the customer relations management information including the service identifier and the designated network identifier.

12. The database system recited in claim 11, wherein the server system is further configurable to cause:
receiving from the designated customer relations management service a response message indicating that the designated customer relations management service manages an account corresponding with the service identifier and the designated network identifier.

13. The database system recited in claim 11, wherein validating the identity claim comprises:
for each of a plurality of data values associated with the identity claim, transmitting a respective object value identification query message that includes the data value to a subset of the plurality of identity nodes via the network; and
for one or more of the data values, receiving a respective object value identification response message that includes a respective network identifier corresponding with the respective data value.

14. A computer program product comprising computer-readable program code capable of being executed by one or more processors when retrieved from a non-transitory computer-readable medium, the program code configurable to cause:
receiving via a communication interface from a client machine a request to contact a service provider, the request associated with an identity claim and including a service identifier, wherein the request is received at a metaverse provider, and wherein the client machine is configured to present a shared virtual reality experience;
validating the identity claim via a distributed identity service that includes a plurality of identity nodes in communication via a network, wherein validating the identity claim includes determining a designated network identifier associated with a distributed identity account shared among the plurality of identity nodes;
transmitting to a plurality of customer relations management services a service query that includes the service identifier and the designated network identifier; and
establishing a communication session between a service provider remote computing system and the client machine, the communication session including a shared virtual reality interaction between the service provider and the client machine the service provider storing customer relations management information at a designated one of the plurality of customer relations management services, the customer relations management information including the service identifier and the designated network identifier.

15. The computer program product recited in claim 14, wherein the program code is further configurable to cause:
receiving from the designated customer relations management service a response message indicating that the designated customer relations management service manages an account corresponding with the service identifier and the designated network identifier.

\* \* \* \* \*